United States Patent
Grosser et al.

(10) Patent No.: US 7,130,836 B2
(45) Date of Patent: *Oct. 31, 2006

(54) APPARATUS AND METHODS FOR A COMPUTER-AIDED DECISION-MAKING SYSTEM

(75) Inventors: John T. Grosser, Derry, NH (US); Ali Ghaed, Bethesda, MD (US)

(73) Assignee: XFI Corporation, Bethesda, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/954,057

(22) Filed: Sep. 28, 2004

(65) Prior Publication Data

US 2005/0086187 A1    Apr. 21, 2005

(51) Int. Cl.
*G06F 17/00* (2006.01)
*G06N 5/02* (2006.01)

(52) U.S. Cl. .............................. 706/47; 706/46; 706/52

(58) Field of Classification Search ................. 706/47, 706/52, 46; 705/26
See application file for complete search history.

(56) References Cited

U.S. PATENT DOCUMENTS

| | | | |
|---|---|---|---|
| 5,123,057 A | 6/1992 | Verly et al. | 382/156 |
| 5,251,294 A | 10/1993 | Abelow | 707/512 |
| 5,481,647 A | 1/1996 | Brody et al. | 706/11 |
| 5,550,746 A | 8/1996 | Jacobs | 700/231 |
| 5,704,017 A | 12/1997 | Heckerman et al. | 706/12 |
| 5,706,495 A | 1/1998 | Chadha et al. | 707/2 |
| 5,717,865 A | 2/1998 | Stratmann | 705/10 |
| 5,754,850 A | 5/1998 | Janssen | 707/104.1 |
| 5,765,028 A | 6/1998 | Gladden | 706/25 |
| 5,768,142 A | 6/1998 | Jacobs | 700/231 |
| 5,778,150 A | 7/1998 | Chan et al. | 706/46 |
| 5,787,234 A | 7/1998 | Molloy | 706/46 |
| 5,793,888 A | 8/1998 | Delanoy | 382/219 |
| 5,794,229 A | 8/1998 | French et al. | 707/2 |
| 5,842,199 A | 11/1998 | Miller et al. | 707/2 |
| 5,852,715 A | 12/1998 | Raz et al. | 709/201 |
| 5,862,364 A | 1/1999 | Todd | 703/2 |
| 5,870,752 A | 2/1999 | Gibbons et al. | 707/102 |
| 5,874,955 A | 2/1999 | Rogowitz et al. | 345/589 |
| 5,893,909 A | 4/1999 | Nomura et al. | 707/5 |
| 5,918,225 A | 6/1999 | White et al. | 707/3 |
| 5,920,852 A | 7/1999 | Graupe | 706/26 |
| 6,012,051 A * | 1/2000 | Sammon, Jr. | 706/52 |
| 6,119,101 A * | 9/2000 | Peckover | 705/26 |
| 6,826,541 B1* | 11/2004 | Johnston et al. | 705/36 R |
| 2003/0083914 A1* | 5/2003 | Marvin et al. | 705/7 |

* cited by examiner

*Primary Examiner*—Joseph P. Hirl
(74) *Attorney, Agent, or Firm*—Schiff Hardin LLP

(57) ABSTRACT

A computer-aided decision-making system and method that is applicable to a variety of decision-making contexts and applications such as, but not limited to, automobile or home purchase decisions. The computer-aided decision-making system provides immediate, useful, and relevant information to a person in a decision-making context, overcoming common human cognitive problems that occur in decision-making, and enabling consumer purchases in an on-line sales environment. In particular, aspects of the invention that aid a person in decision-making include, but are not limited to: managing all the sub-decisions, educating the decision-maker, highlighting the most important sub-decisions, offering the most viable proposals for evaluation, distinguishing significant differences between proposals, supplying various evaluation tools, preventing blind spots, assisting the decision-maker's memory, gauging the progress of the decision process, and learning about the decision maker from the decision process.

46 Claims, 29 Drawing Sheets

FIG. 1a (Figure: patent drawing of a user interface showing reports, topics, and house comparison tables. Labels 101–106 point to various UI regions including user personas (System, Contrarian, Builder, Banker, Decorator), navigation tabs (Topics, Goals, Requirements, Houses), report tabs (Details, Reject, Billboard, History, Compare, Visit, Map, Consumer, Closing, Value, Time, Send, Scorecard, Reviews), and a table of houses.)

Banker:
You're choosing a house that is much higher than the budget you set. If we need to make an adjustment, click on the Requirements tab.

| Score | Address | Banker | Decorator |
|---|---|---|---|
| 1 | 28 Del Ray Bethesda | ○ | ○ |
| 2 | 3 Maple Bethesda | ○ | ○ |
| 3 | 1300 Wisconsin Bethesda | ○ | ○ |
| 4 | 2 Arlington Bethesda | ○ | ○ |
| 5 | 1100 Bethesda Bethesda | ○ | ○ |

| | Address | Price | Style | Bedrooms | Bathrooms | Garage | Laundry | Exterior |
|---|---|---|---|---|---|---|---|---|
| 1 Y | 410 Bethesda Bethesda | 349,000 | Ranch | 3 | 1 | two cars | yes | Brick |
| 2 Y | 301 Del Ray Bethesda | 205,000 | Colonial | 5 | 4 | car port | no | Aluminum |
| 3 Y | 1300 Wisconsin Bethesda | 304,000 | Cape Cod | 4 | 2.5 | one car | yes | Shingle |
| 4 Y | 4711 Maple Bethesda | 290,000 | Cape Cod | 3 | 2 | three car | no | EFACE |
| 5 Y | 2100 Woodmont Bethesda | 333,000 | Victorian | 3 | 4 | two cars | yes | Brick |
| 6 Y | 147 Bradley Bethesda | 395,000 | Victorian | 3 | 2 | car port | yes | Stucco |
| 7 Y | 35 Arlington Bethesda | 287,000 | Cape Cod | 2 | 2 | three car | no | Aluminum |
| 8 Y | 550 Wisconsin Bethesda | 315,000 | Ranch | 4 | 4 | car port | no | Brick |

FIG. 1b

$X_U^F$ : Upper Pane item of facet including Value & Influence = $X_{v_l} + X_{u_v}$ $X_L^F$ : Lower Pane item of facet including Value & Influence = $X_{L_l} + X_{L_v}$ ($X_{L_V}^F$ – Surrogate, Value)

$X_{U_X}^F \Leftarrow$ Set by user $X_{L_V}^F \Leftarrow \sum_{i=1}^{N} X_U^{F+i}$ $X_{L_I}^F \Leftarrow \sum_{i=1}^{N} X^{F-i} = X_U^{F-i} + X_L^{F-i}$ $X_{L_I}^F \Leftarrow X_L^{F+i}$ $X^F = X_U^F \oplus X_L^F$

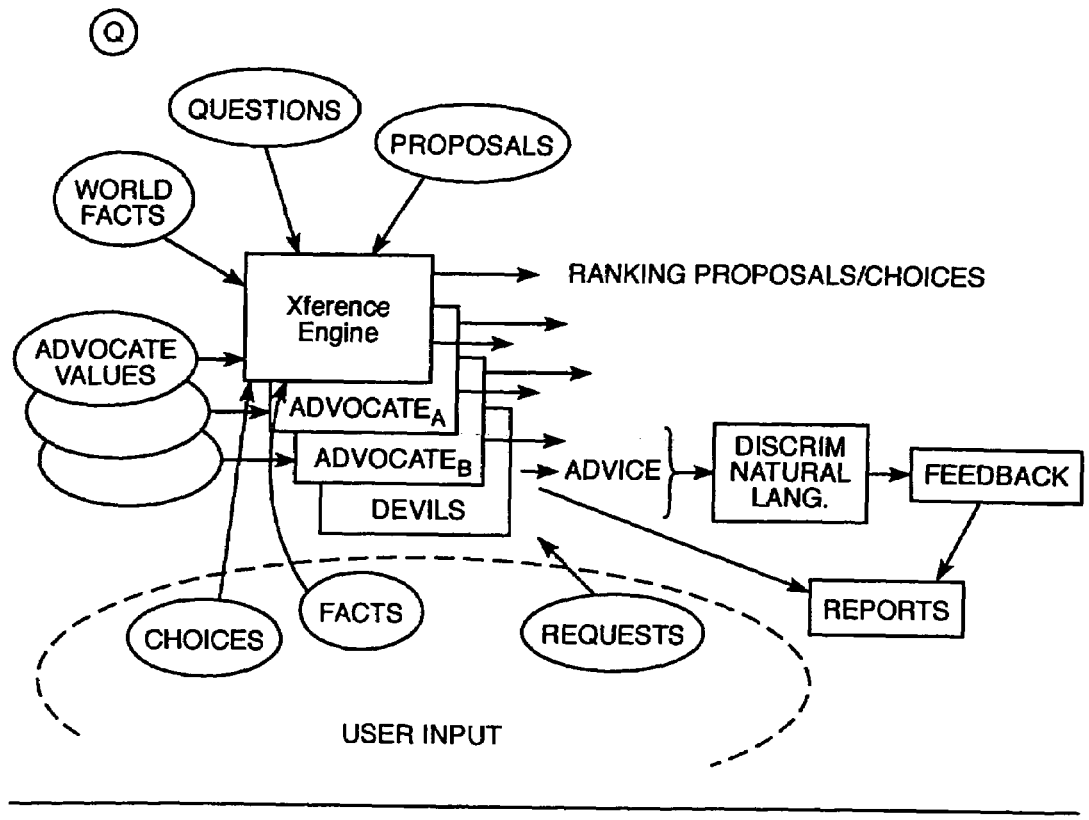
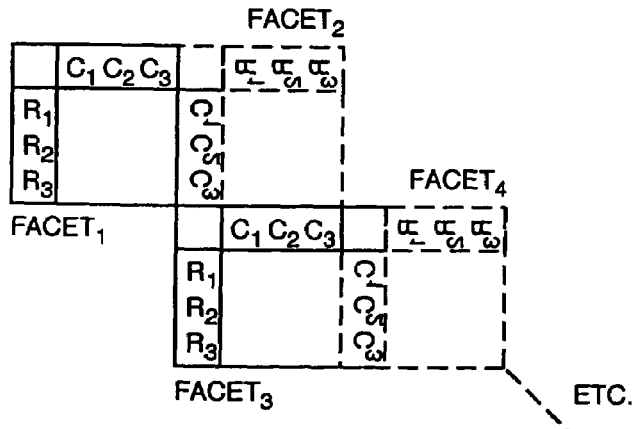
Figure 6

Advocate Attribute score
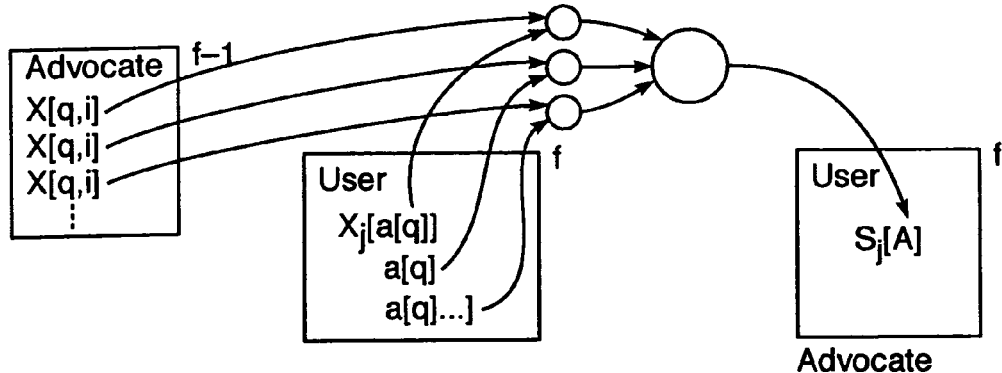
Report Attribute score
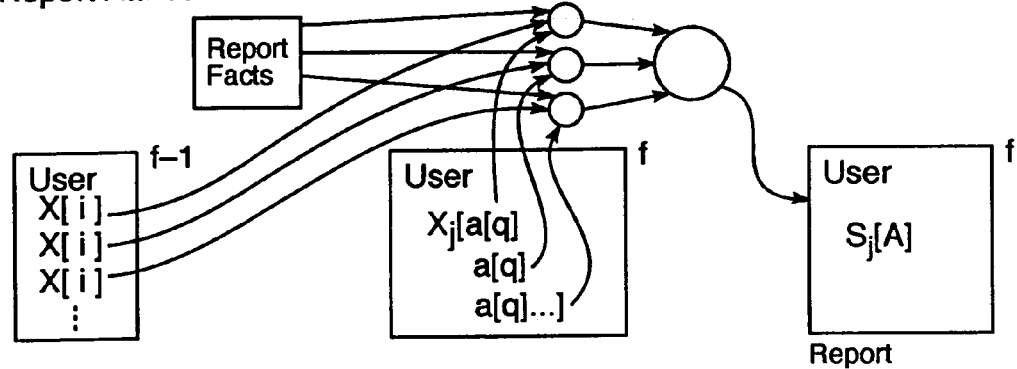
Choice Attribute score
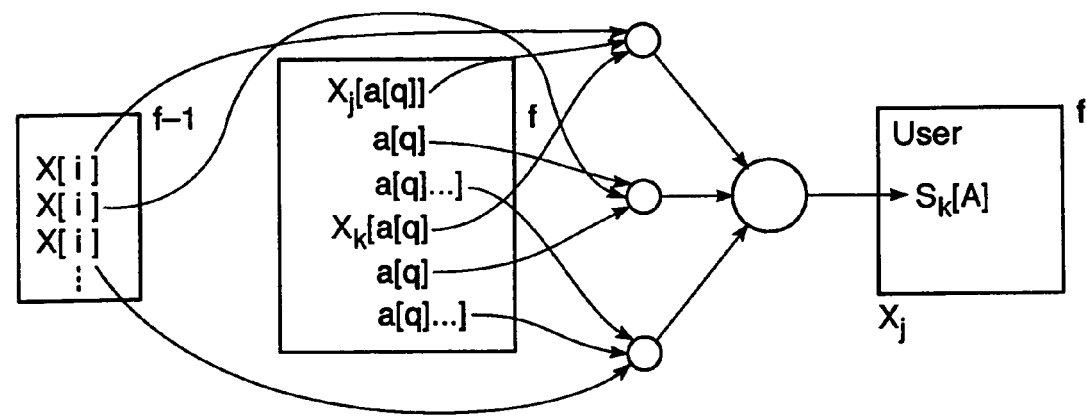
Figure 7

| Category | 1 | 2 | 3 | 4 | 5 |
|---|---|---|---|---|---|
| Description | SaleSuite | SaleSuite | SaleSuite | Professional | Enterprise |
| Characteristic | Walk-up | Multi Session | Process Oriented | Analyst's Tool | Collaborative |
| Facets — Customization | Optional | Optional | Optional | Optional | Optional |
| Facets — Proposals | Simple | Hierarchical | Dynamic | Dynamic | Continuous |
| Facets — Requirements | Combined | Yes | Yes | Yes | Yes |
| Facets — Goals | | Yes | Yes | Yes | Yes |
| Facets — Topics | Optional | Optional | Yes | Yes | Yes |
| Facets — Context/Facts | No | No | Implicit | Combined | Yes |
| Facets — Resources | No | No | No | | Yes |
| Facets — Time | No | No | No | Optional | Yes |
| Facets — Philosophy | No | No | No | Yes | Yes |
| Lower-end Application Example | Christmas shopping | New cars | Real Estate | Securities Advisor | Strategic Business Planning |
| Higher-end Application Example | Flowers | Used cars | Mutual funds | Personal Financial Planning | Project Managment |

Left Facet: Just Words (Hints and Cues)
Lower Pane: Multilply insatiable "hint" choices
　　　　　　Other words the user has searched on before
Upper pane: Users search words.

For Example:

601

The site should contain "XFI"
The site should be of the kind: "company"
The site should be related to "decision"
The site should be related to "sales"

What should the site contain?
What kind of site?
What should the site be related to?
The site should contain "xene"

Middle Facet: Associations

By "company," I mean: "Web site of a corporation"
XFI should appear "as a stand-alone word"

Decision
　　　Decision Support Systems
　　　How to make decisions
　　　Psychics
　　　Decision making software
　　　...
Sales
　　　Stores
　　　Salespeople Employment Related
　　　　　　Wanted
　　　　　　Available

602

603 — Right Facet: Web Sites

| | Description | Value |
|---|---|---|
| ⊕ | Intended Use | For transporting kids, Family car, For sporting / recreation use |
| ⊕ | Cost of ownership | |

| | Description | Value |
|---|---|---|
| ⊖ | | |
| | Good Insurance rating | Likely |
| | Airbags | Likely |
| ⊖ | NHTSA Crash Tests | |
| | Driver | ***** |
| | Passenger | ***** |
| | ABS Brakes | Likely |
| | Traction control | Maybe |
| | Child safety locks | Likely |
| ⊕ | Agenda/Popularity | |
| ⊕ | Security | |
| ⊕ | Comfort | |
| ⊕ | Prefer Import/Domestic | |
| | Handles Well | Maybe |

System: Are you sure about the 'Long distance driving' ?

Topics | Profile | Lifestyle | Goals | Requirements | Vehicles

System  Working Mom  Mechanic

Applet com.xfi.xsp.ui.apt.XFrameApt Test Frame

Status

Search for ▽ Search

○ Exclude

```
┌─────────────────────────────────────────────────────────────┐
│ ☐ Purchase                                      _ □ ✕       │
│ ┌─────────────────────────────────────────────────────────┐ │
│ │ ------: Referral                                        │ │
│ │       ╭──╮  ╭─────────────────────────────────────────╮ │ │
│ │ ┌──┐  │☺ │  │ System:                                 │ │ │
│ │ │  │  ╰──╯  │ The vehicle requested in the upper pane │ │ │
│ │ └──┘        │ will be sent to the dealer.             │ │ │
│ │             │ Add or remove options as appropriate.   │ │ │
│ │             ╰─────────────────────────────────────────╯ │ │
│ └─────────────────────────────────────────────────────────┘ │
```

| | Vehicle | Contact | Summary | Request |

( Promote All ) ( Demote All ) ( Print ) ( Save As ) ( Cancel )

| | Vehicle | Invoice | MSRP |
|---|---|---|---|
| ○ | Ford Explorer XL 4WD | $23,173 | $23,950 |
| ○ ⊖ | XL Appearance Group (MFR. 86D) | $ 961 | $1130 |
| ○ | Seat, Cloth Captain's Chairs | | |
| ○ | Power Windows, One Touch, Lockout | | |
| ○ | Power Door Locks & Outside Mirrors | | |
| | Rack, Luggage | | |

| | Options | Invoice | MSRP |
|---|---|---|---|
| ○ ⊕ | Decor and Trim | | |
| ○ ⊕ | Miscellaneous Interior | | |
| ○ ⊖ | Safety | | |
| ○ | Front Side Airbag (MFR. Code 21A) | $332 | $390 |
| ○ ⊕ | Sound System and Clock | | |
| ○ ⊕ | Transmissions | | |

FIG. 16h

APPARATUS AND METHODS FOR A COMPUTER-AIDED DECISION-MAKING SYSTEM

This application claims the benefit of U.S. Provisional Patent Application Ser. No. 60/118,814, filed Feb. 5, 1999, the entire disclosure of which, including references and appendices incorporated therein, is incorporated herein by reference.

This disclosure contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The invention relates generally to the field of decision support systems, and, more specifically, to the field of computer-aided decision-making methods and systems.

BACKGROUND OF THE INVENTION

In the past, various methods and systems have been developed in an attempt to improve man's ability to make good decisions. Many psychological studies demonstrate the limitations in human cognitive abilities which lead to poor decisions. Known methods and systems tend to emphasize either process or analysis aspects of decision-making. As a result, known methods and systems are either overly simplistic, in an effort to be applicable to many different types of decisions, or are deep and complicated methods and systems that are appropriate only to the most sophisticated decisions. Further, known methods and systems do not adequately reflect intangible aspects of many real decisions. For these and other reasons, known methods and systems have met with limited user acceptance, particularly in a consumer context.

SUMMARY OF THE INVENTION

Therefore, it is a general object of this invention to provide methods and a system that provides immediate, useful, and relevant information and feedback to a person in a decision-making context that helps the person to evaluate and rank a plurality of choices and to converge to a decision, and, particularly, a consumer purchasing decision.

Another general object of the invention is to provide methods and a system that compensates for common human cognitive problems that occur in decision-making.

A still further general object of the invention is to enable consumer purchases in a non-tactile purchasing environment such as, but not limited to, those encountered in web-based or on-line sales transactions.

These objects, and others which will be apparent upon review of the disclosure, including the specification, drawings, and appendices, are achieved in a preferred embodiment of a computer-based decision-making system in exemplary on-line home and automobile purchasing decisions.

The computer-aided decision-making system and methods employ a rules-based analysis engine having a plurality of rules for selecting, scoring and ranking a plurality of subchoices. A user interface accepts user-provider information, promotions, and responses to system inquires for generating reports, proposals and feedback. The invention provides immediate, useful, and relevant information to a person in a decision-making context, overcoming common human cognitive problems that occur in decision-making, and enabling consumer purchases in an on-line sales environment. In particular, aspects of the invention that aid a person in decision-making include, but are not limited to: managing all the sub-decisions, educating the decision-maker, highlighting the most important sub-decisions, offering the most viable proposals for evaluation, distinguishing significant differences between proposals, supplying various evaluation tools, preventing blind spots, assisting the decision-maker's memory, gauging the progress of the decision process, and learning about the decision maker from the decision process.

BRIEF DESCRIPTION OF THE DRAWINGS

Figure 1B:
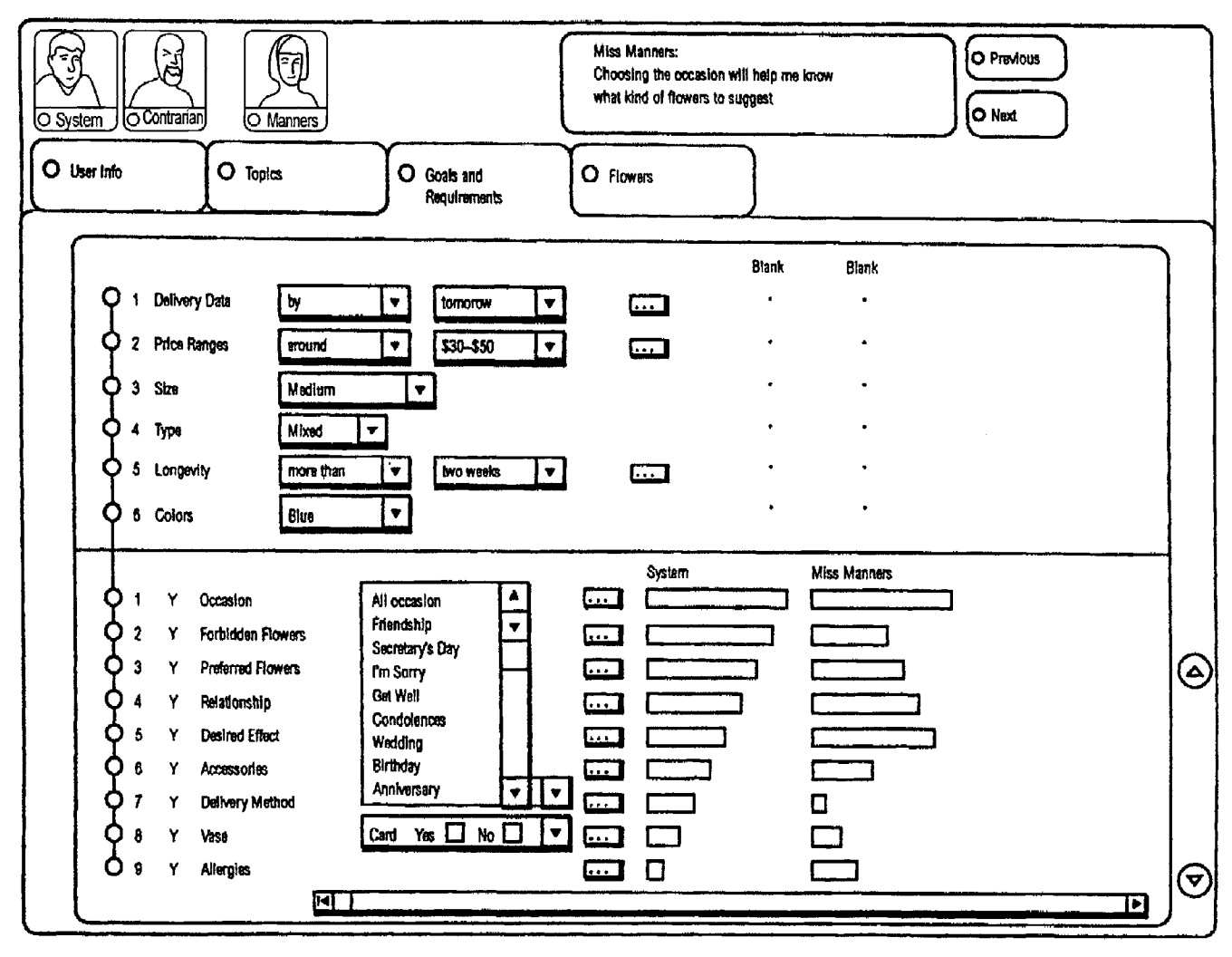

FIG. 1A is an illustration of a computer-based user interface for the proposal facet of a preferred embodiment of a computer-aided decision-making system;

FIG. 1B is an illustration of a computer-based user interface for a combined requirements/goals facets of a computer-aided decision-making system;

FIG. 6 illustrates a relationship between the contents contained within adjacent facets;

FIG. 7 illustrates the attribute scoring process used by the computer-aided decision-making system;

FIG. 13 describes a relationship between facets and alternative applications of varying complexity of the computer-aided decision-making system;

FIG. 14 illustrates a search frame within the computer-aided decision-making system;

Figure 16B:
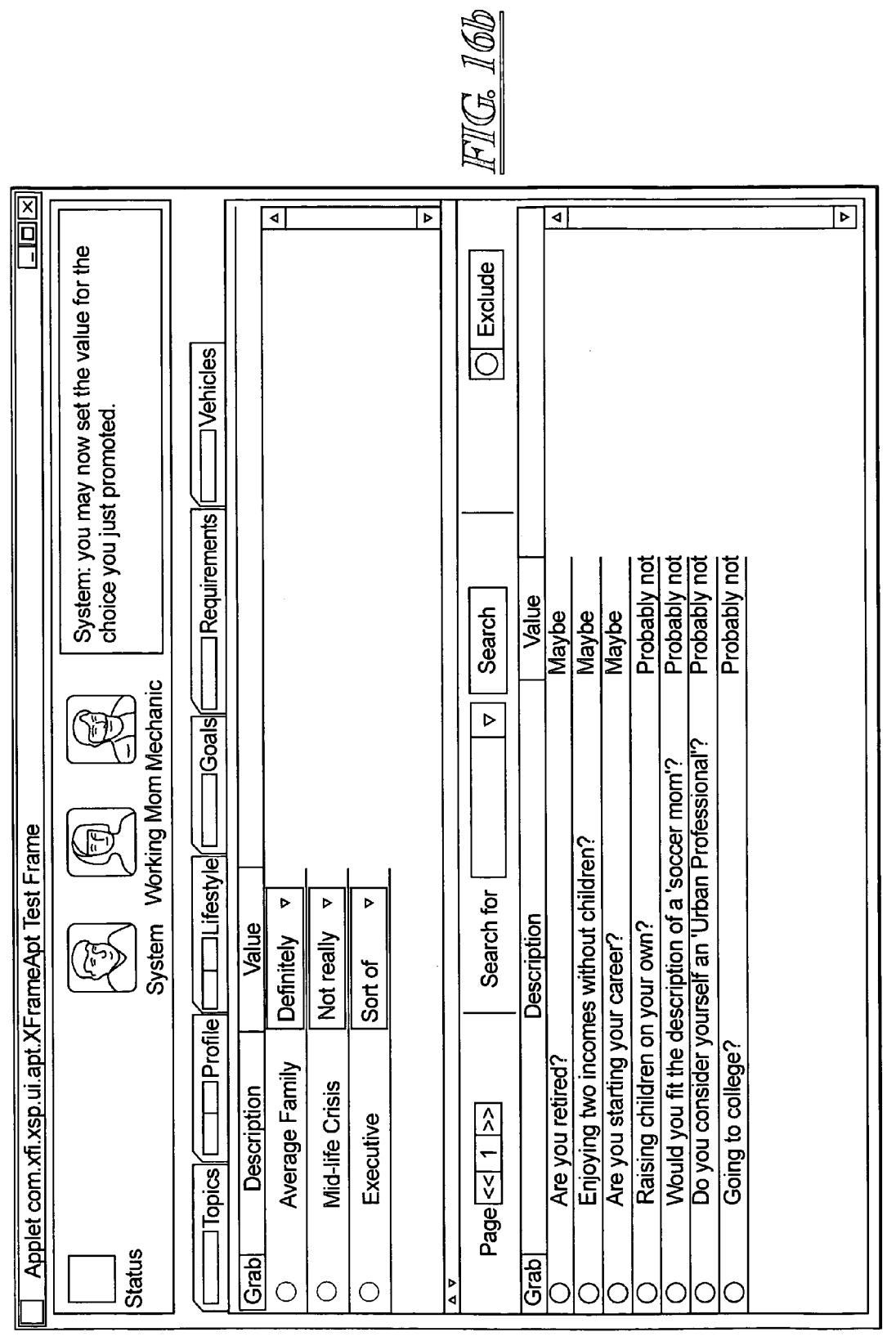
Figure 16D:
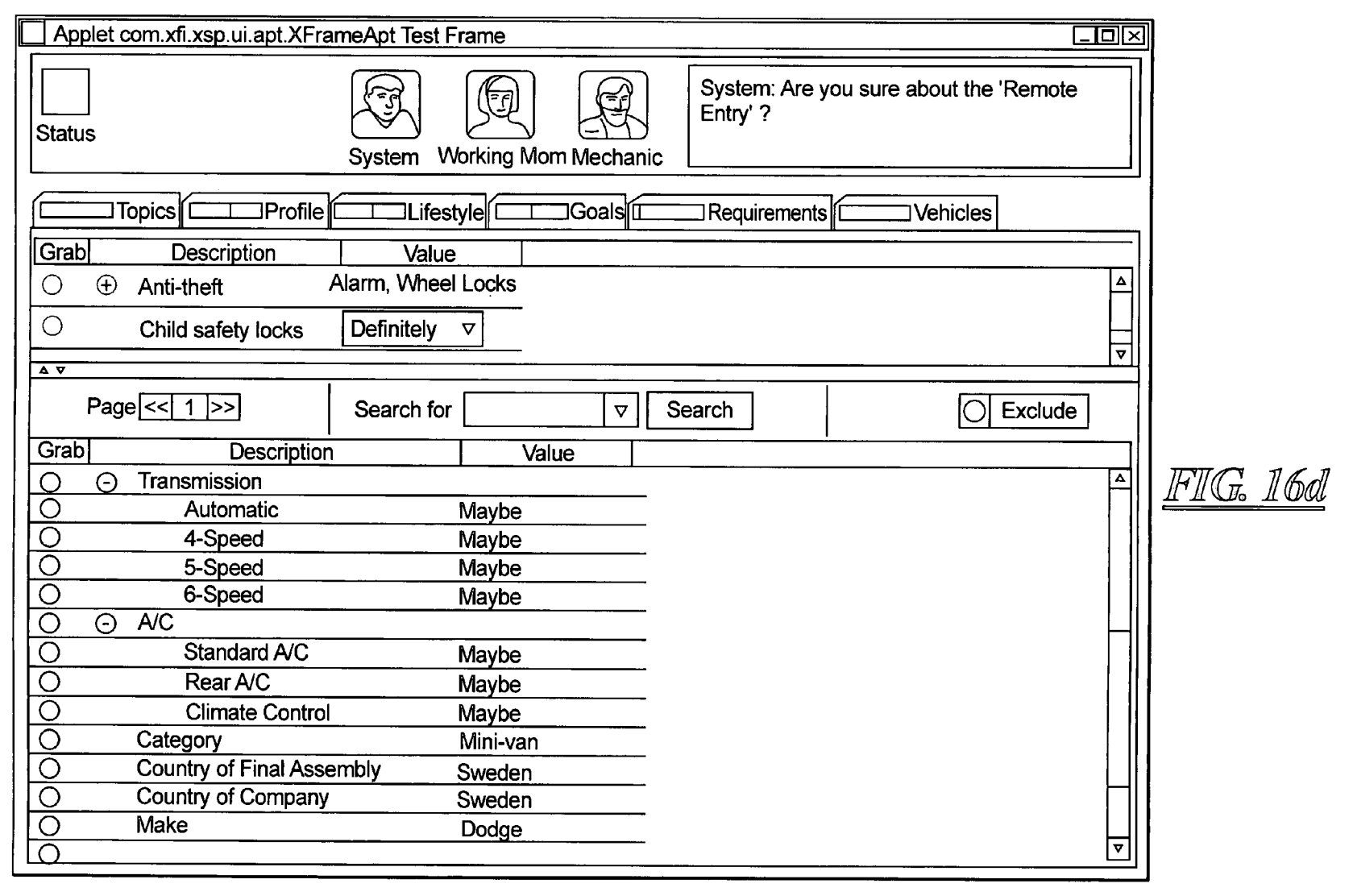
Figure 16H:
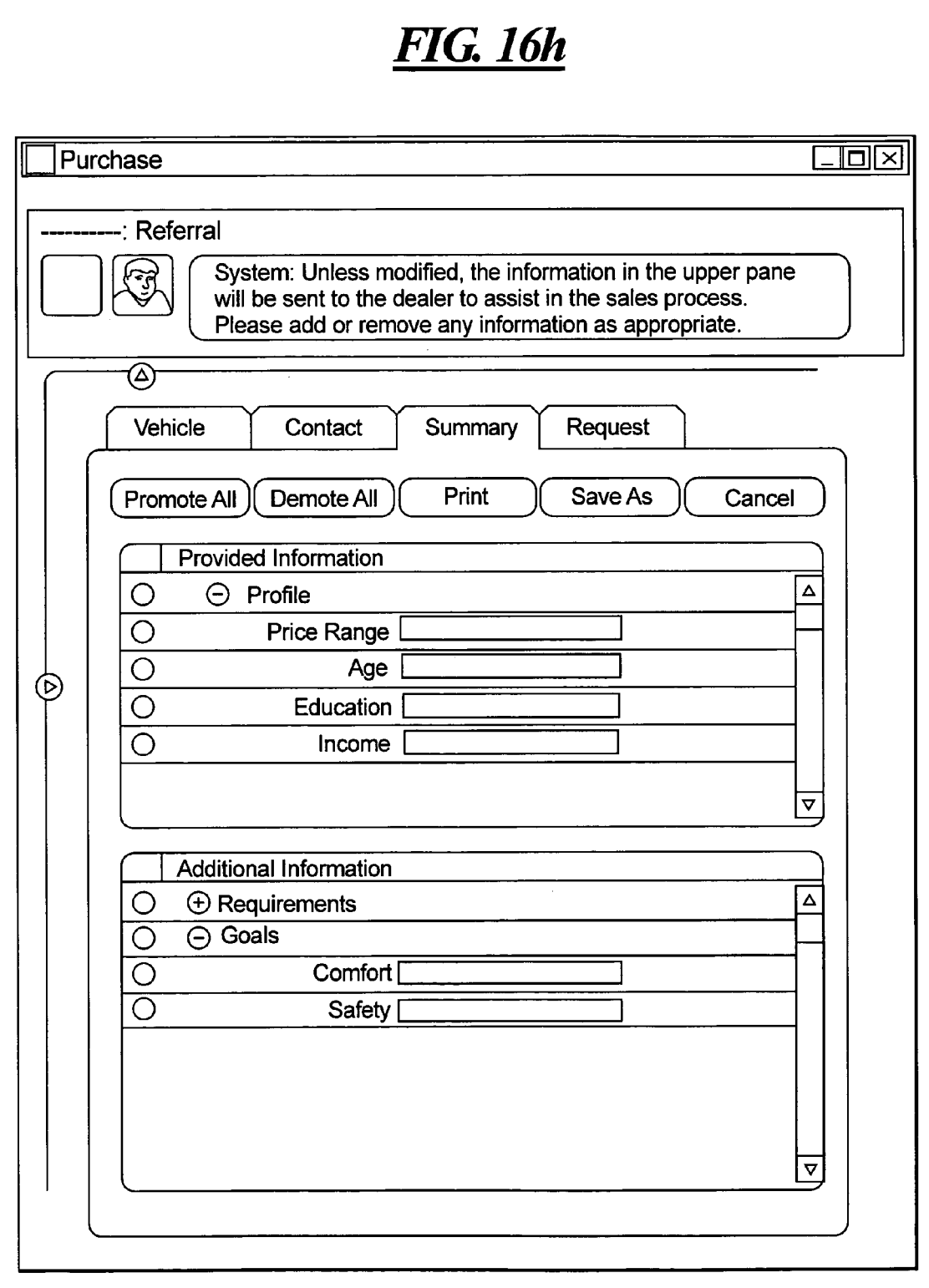

FIGS. 16A through 16K are screen displays for a automotive purchasing decision according to the present invention.

DETAILED DESCRIPTION OF THE PREFERRED EMBODIMENTS

Figure 1C:
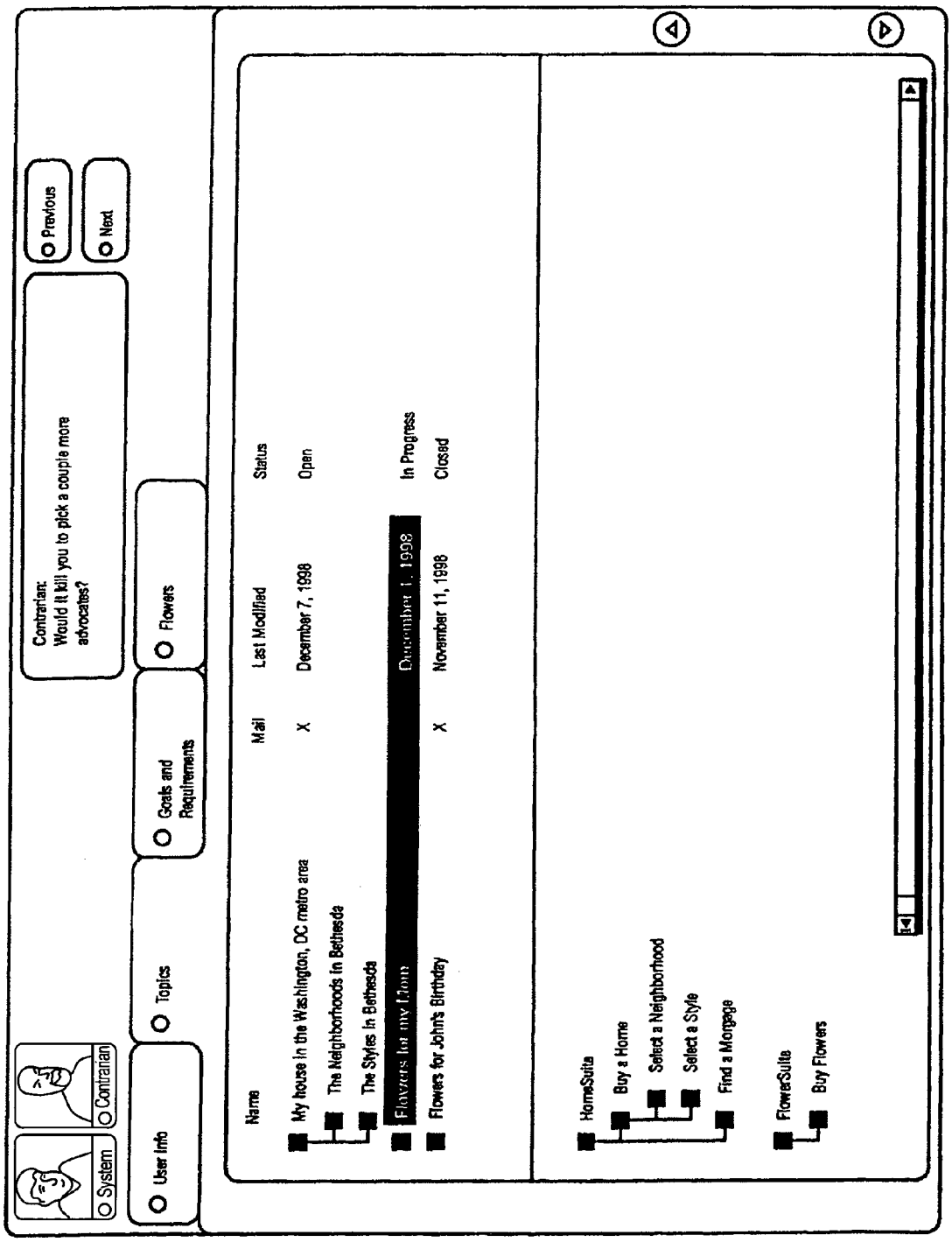
FIG. 1C is an illustration of a computer-based user interface for a topics facet of a computer-aided decision-making system.

The present invention will be described in detail with reference to exemplary applications of an on-line home buying purchase decision assistance system and an on-line automobile buying purchase decision assistance system. However, it should be recognized that the system and its components are applicable to a wide range of decision-making contexts and applications, including, but not limited to, simple shopping decisions, electronic searching, or complicated decision domains such as collaborative corporate strategic planning. For example, alternative exemplary applications of the present invention include a computer-aided purchasing of flowers, stock or securities selection, Internet website searching, purchasing of real estate, dating or matchmaking, strategic business planning, personal financial planning, project management, shopping, or, generally, any decision-making context in which a human decision-maker must choose from among a plurality of choices.

In order to effectively assist a user in a decision-making context, the system and method of the present invention organizes the decision process into one or more elements of the decisions as described herein. These elements may include, but are not limited to: Goals, which help to establish the relevancy of underlying information so that the computer-aided decision-making system will supply the most useful data to the decision-maker user; requirements, which are actually sub-decisions that the decision-maker user uses to limit the number of proposals he needs to consider; proposals, which are possible outcomes that use goal and requirement data to compete and distinguish themselves to the decision-maker user; educators that assist the decision-maker user by supplying information that is relevant to the decision (or sub-decision) at hand; advocates, which represent a point of view and help the decision-maker user avoid mistakes by pointing out inconsistencies in the decisions (or sub-decisions) he has already made or is about to make; decision gauges, which show the decision-maker user the state of the decision, from early inconsistencies, through data gathering and refinement, to final showdown and conclusion; and decision topics, which are other decisions that have a bearing on the decision or may be influenced by the outcome of the decision, and are therefore related to the main decision but are large enough to be considered separately from the main decision. These decision elements together comprise a decision frame for a particular decision-making context.

With respect to these decision elements, goals represent the true goals of the decision-maker user. For example, in a home-purchasing application, the true goal is likely not to purchase a house simply for the sake of making a house purchase, but rather the true goal may be to find affordable family housing for 2 parents, 4 kids and 2 dogs, protection of two cars, accommodations for an occasionally visiting grandmother, provision of good schooling for the kids and a reasonable return on investment in 20 years.

Most decisions have certain attributes that can be specified, or at least bounded, independent of each other. Identifying these bounds and their importance speeds up the decision making process by avoiding inappropriate proposals from being considered. In a presently preferred embodiment of the present invention, these decision bounds are provided in the form of requirements. It is important that the decision-maker user not be required to supply an overly constraining set of requirements to arrive at a distinguishable solution. It is also important to be able to indicate which attributes that are important, even if the value may be flexible (i.e. "it depends"). Requirements are not necessary to make a decision. However, the present invention helps the decision-maker user to understand the effect and importance of various requirement decisions to the overall decision.

Usually real decisions come down to the hard choices between suitable proposals. Finding suitable proposals is facilitated by having well defined goals and requirements. However, browsing through the possible proposals is a common form of decision-making. The present invention assists the decision-maker user by finding similar proposals to the decision-maker's preferred proposals and highlighting the differences so that the "more preferable" proposals can be quickly identified. The decision-maker user communicates his preferences by placing good proposals in his short list. Any proposal can comment on any other proposal in an attempt to promote itself higher in (or into) the short list. As the decision progresses, the decision-maker will focus his attention on the final proposals in his short list. He may appoint more and more advocates to represent their perspectives on the proposals and use various metrics to further refine the distinctions between proposals. At some point, one proposal will rise above the others in the decision-maker's mind, and the decision will have been made. During the whole decision process, the proposal list is always active, with the most promising proposals (outside the short list) coming to the top as the decision maker refines his goals, requirements and preferred proposals.

Each goal, requirement, and proposal preference is actually a sub-decision. As such the decision-maker can ask for more information regarding that sub-decision. Educators are a data-rich resource that assists the decision-maker user with facts (trends, charts, demographics, etc.) relevant to the decision at hand.

Before or after making a sub-decision, the decision-maker user may get feedback from the advocates as to their suggestion for his decision or their opinion of his decision. Advocates encapsulate their (often conflicting) points of view in rules that show relations among elements in the decision. Since each advocate is associated with a certain perspective or set of goals, their opinions help the decision-maker user to distinguish between competing proposals, especially if the decision-maker user has not stated his goals.

As the decision progresses, the present invention reflects the progress in a number of ways, including the completeness of the decision makers goals and requirements, their consistency and specificity, and the remaining pool of viable proposals. A typical decision process begins with no proposals in the short list, followed by a swelling of the short list and then a final competition in the short list among a few proposals. At some point the decision gauges will indicate that there is little information left to evaluate, few advocates of importance to consult and little more analysis to perform. When that is the case and the unspecified goals or requirements would have little or no impact on the proposals in the short list, the decision is judged complete. Of course, the decision-maker user may reach a cognitive commitment long before that point.

At various points in the decision, it may be necessary to focus on a related decision in order to allow the overall decision-making process to proceed. In an exemplary home-purchasing application, such decision topics may include choosing a neighborhood, choosing a realtor, or choosing a lender. These related decisions are grouped together into decision topics to allow the decision maker to spawn a separate decision and utilize all the same style tools to make that decision. All sub-decisions (goals and requirements) that relate to both the main and related decision are reflected through to the other decision, including the outcome of either decision.

Use and operation of the computer-aided decision-making system of the present invention may be understood with reference to its real-time interaction with a user during one of a plurality of user sessions as indicated in FIG. 1A.

Referring to FIG. 1A, a presently preferred embodiment of a computer-aided decision-making system 100 includes a user interface comprising one or more advocates 101 and a plurality of facets 102. In a presently preferred embodiment, the user interface of computer-aided decision-making system 100 is displayed on a personal computer display such as, but not limited to, a color monitor device. In an alternative embodiment, the user interface of computer-aided decision-making system 100 is displayed on a user data appliance such as, but not limited to, a personal digital assistant (PDA). Further, in a presently preferred embodiment, computer-aided decision-making system 100 user interface includes multimedia features including, but not limited to, audio, animation, and video, as well as procedural aids such as, but not limited to, wizards, checklists, and roadmaps. A preferred user interface also includes navigation controls (e.g., buttons, page up/down, text search) for logical paging and cursor location/pointing movement, as well as a churn icon to indicate that analysis engine 330, shown in FIG. 2, is processing a rules iteration.

In a given user session in which a user interacts with computer-aided decision-making system 100, the user may choose to be assisted in making a purchasing decision by one or more advocates 101. In a presently preferred embodiment of computer-aided decision-making system 100 for a home purchasing application as illustrated at the top of FIG. 1A, the advocates 101 comprise a system advocate, a contrarian advocate, a builder advocate, a banker advocate, and a decorator advocate. In a presently preferred embodiment, advocates 101 are ordered from left to right such that advocates on the left have stronger opinions than advocates on the right (reference FIG. 1A). Through advocates 101, computer-aided decision-making system 100 conveys to the user information useful to the decision-making context from a particular point of view. Relatively large differences between one or more attribute values of proposals in the user's "short list" of choices and the corresponding attribute values associated with new user choice inputs may trigger an unsolicited advocate 101 opinion. For example, referring to FIG. 1A, the banker advocate is informing the user that the price of the currently-selected choice is (e.g., selected house) is higher than the price budget preference established previously by the user.

It is to be understood that the information reported to the user by advocates 101 may include, but is not limited to, any information determined by computer-aided decision-making system 100 to be relevant to the decision domain. Further, the user may provide value parameters via user input to the Requirements facet for computer-aided decision-making system 100 to use, in conjunction with other information, in triggering an advocate response to the user. An advocate response may include, but is not limited to, a displayed text caption, displayed decision gauges as described herein, an audible alerting sound, spoken text, displayed dynamic facial expressions, or hand signaling. In this manner, computer-aided decision-making system 100 uses advocates 101 to assist the user in making a decision through, for example, but not limited to, narrowing the field of search, discarding possible choices, changing user requirements, evaluating or challenging the user's ranking of user-made choices, evaluating and comparing their choices to those of other advocates, or, generally, alerting the user to inconsistencies between current user input or behavior and prior user input or system expectations.

In a presently preferred embodiment, one or more advocates can take an argumentative attitude (e.g., contrarian). Further, the user has the ability to add, delete, or mute advocates 101; for example, the Contrarian advocate in FIG. 1A has been muted by the user. In a presently preferred embodiment, an advocate 101 will not make audible responses or comment box responses to the user while muted, but can make expressions and head movements. In a presently preferred embodiment, a threshold response control is provided that inhibits one or more advocates 101 from responding when the relative degree of difference between an expected choice or expected value of a choice and a user-entered choice or user-entered value for that choice, respectively, does not exceed a threshold parameter. The threshold response parameter may be entered by the user, determined by computer-aided decision-making system 100, or determined through any combination of these two techniques as well as others. Further, computer-aided decision-making system 100 may override the muted state of an advocate 101 and cause an advocate 101 to provide a response to the user when computer-aided decision-making system 100 determines that such response is required based upon a relationship between the current decision state and recent user behavior. Advocate override may occur independently from the threshold response control function.

Figure 8:
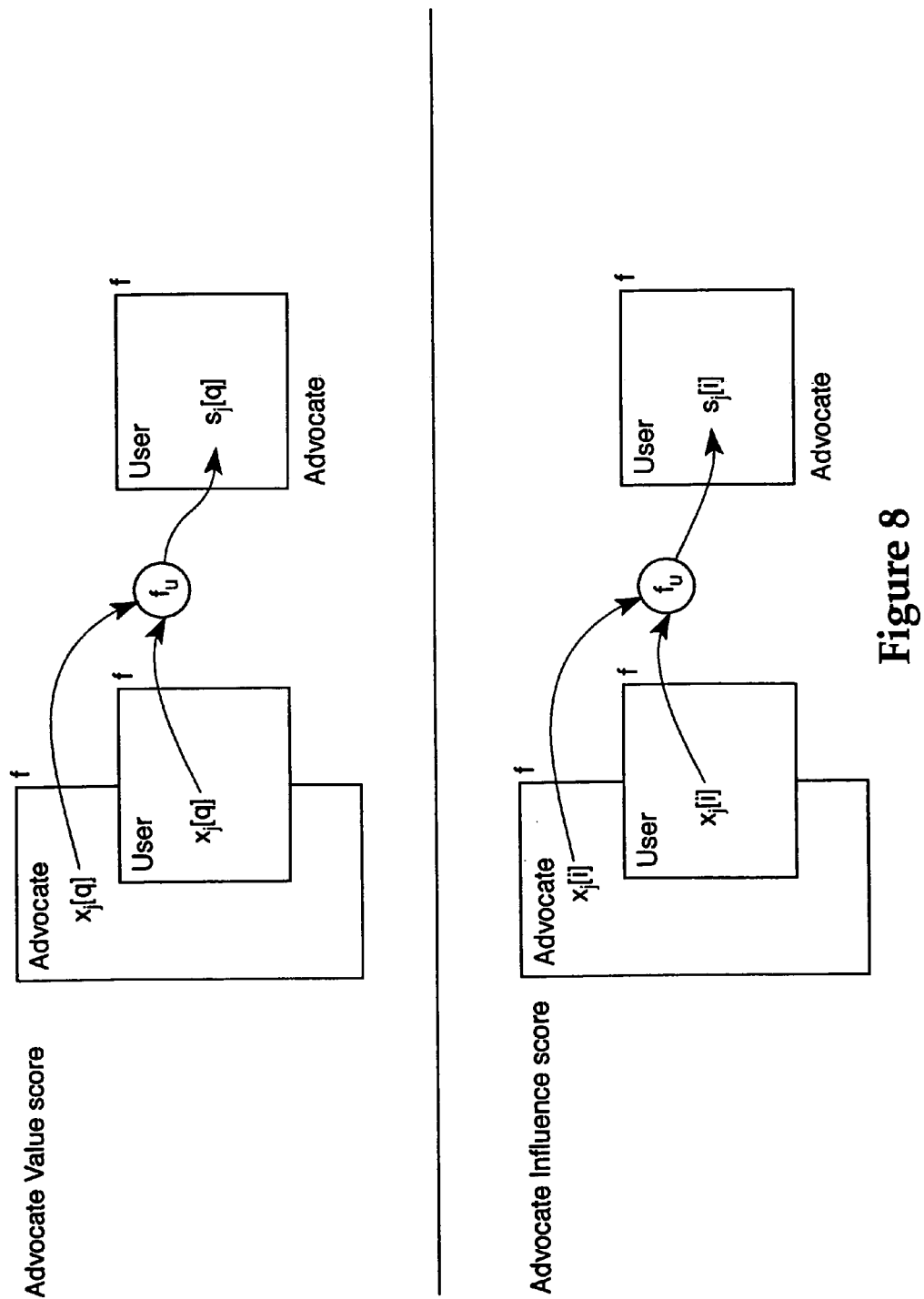
FIG. 8 illustrates the advocate value and influence scoring process used by the computer-aided decision-making system.

Further, in a presently preferred embodiment, computer-aided decision-making system 100 provides an advocate 101 opinion to the user, in the form described herein, for a particular choice upon user request. For example, upon the user requesting the Builder advocate's opinion concerning a particular choice through, for example, but not limited to, using a personal computer mouse device to drag the choice to the Builder item (reference FIG. 1A), computer-aided decision-making system 100 provides an opinion report from the Builder advocate to the user concerning that particular choice. FIG. 8 illustrates the advocate value and influence scoring process used by computer-aided decision-making system 100 in a presently preferred embodiment according to the notation described herein to determine an advocate opinion of a choice and to determine the relative influence of a particular advocate, respectively.

The plurality of facets 102 of a presently preferred embodiment of computer-aided decision-making system 100 for an exemplary home-purchasing application comprises a User Info facet, a Topics facet, a Goals facet, a Requirements facet, and a proposal facet (e.g., Houses). FIG. 13 provides further detail concerning the plurality of facets 102 that a preferred embodiment of computer-aided decision-making system 100 may provide for a particular application. Facets 102 are arranged from left to right in order of general information to specific information, wherein the left-most facet is associated with the most general information. Further, the right-most facet is also called the proposal facet.

Figure 2:
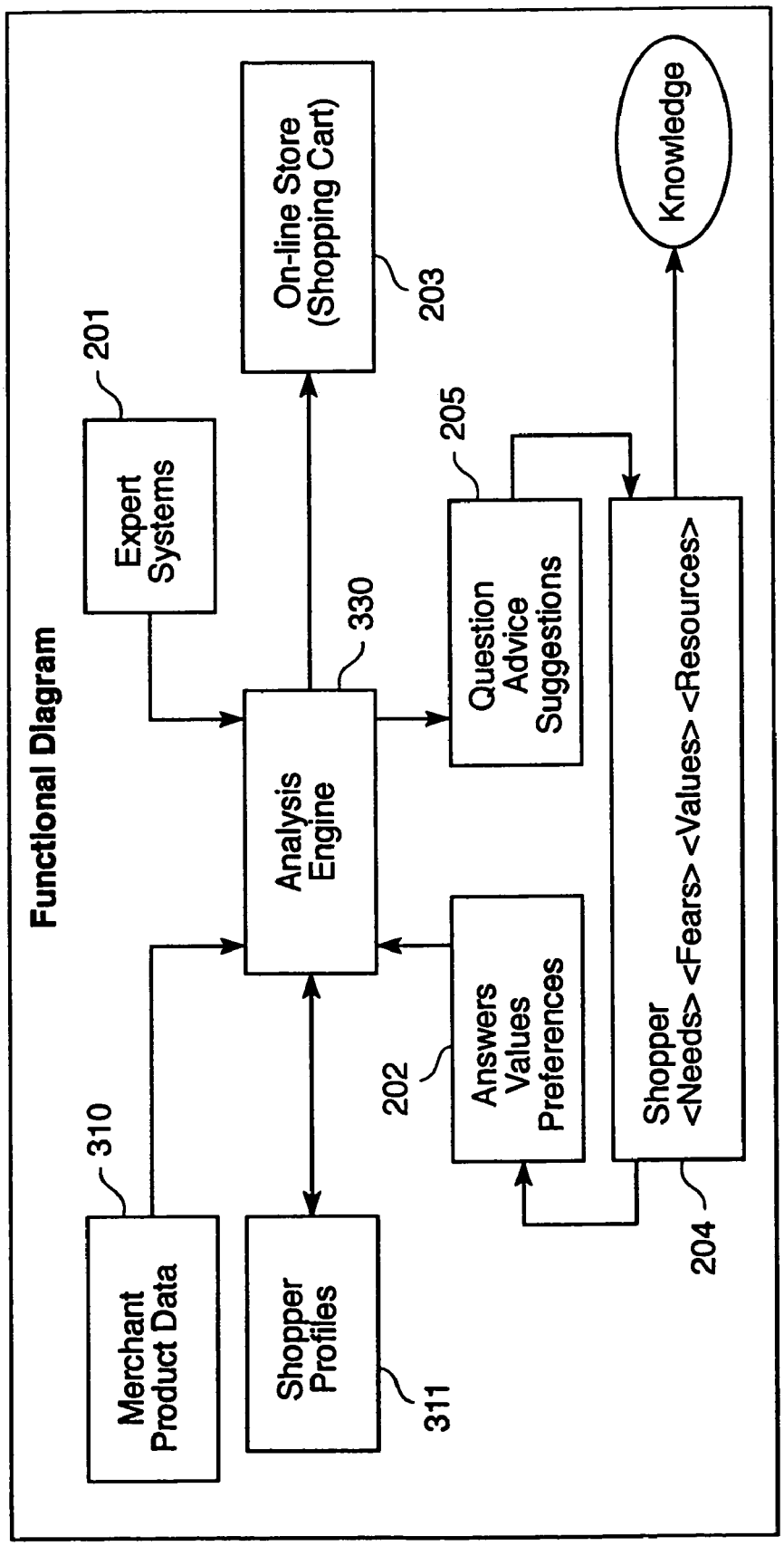
FIG. 2 is a functional block diagram of a computer-aided decision-making system.

Referring to FIG. 1A, the proposal is the Houses facet which is shown as selected. A plurality of facets 102 may be displayed simultaneously. In a presently preferred embodiment, facets 102 are presented to the user in the form of visual tabs in the manner illustrated in FIG. 1A. A user navigates among facets 102 by selecting the tab for the facet 102 which the user wishes to view or interact with. Facets 102 represent sub-decision components of a decision context. For example, by selecting the Requirements facet illustrated in FIG. 1A, the user may enter the number of preferred bedrooms in a house as a criterion for computer-aided decision-making system 100 to use in generating preferred choices in the decision context of a home purchase. The Goals facet, in contrast to the Requirements facet, provides means for the user to specify higher-level information than the objective requirements for the house; for example, by selecting the Goals facet illustrated in FIG. 1A, the user may indicate that his underlying reason for purchasing a house is for investment. FIG. 1B illustrates these aspects, as well as others, for a combined Goals/Requirements facet in an alternative exemplary embodiment of computer-aided decision-making system 100 used in the decision context of a flower purchasing decision application. Computer-aided decision-making system 100 will use this higher-level information in generating a list of preferred choices and in reports to the user by advocates 101. User information contained in the Goals facet is, in turn, specific to a given Topics facet. Information contained in the Topics facet, however, may relate to a plurality of decision contexts (reference FIG. 1C). It is apparent from FIG. 1A elsewhere herein that every decision has a plurality of facets containing a plurality of choices. Further, for simpler applications facets 102 may be combined such that the number of facets presented to the user is reduced compared to the number of facets presented for more complex applications (reference FIG. 1B).

Referring to FIG. 13, the range of facets 102 and their capabilities relative to decision-making process of the computer-aided decision-making system varies according to the relative complexity of the decision context. For relatively simple decision contexts (i.e., Category 1 applications), such as, but not limited to, retail purchase decisions, the range of facets 102 provided by the system may be reduced, or one or more facets 102 may be combined, as compared to the greater range of facets 102, and their capabilities, for more complex decision contexts (i.e., Category 5 applications), such as, but not limited to, strategic business planning. For example, referring to FIG. 13, each frame has a plurality of customization facets making up a frame for proposals.

In a presently preferred embodiment, computer-aided decision-making system 100 aggregates one or more relevant facets 102 into a decision frame associated with the decision domain. For example, a decision frame for an exemplary home-purchasing application comprises a User Info facet, a Topics facet, a Goals facet, a Requirements facet, and a proposal facet as described previously. A decision frame (or "search frame") for a search engine embodiment includes a hints and cues facet, an association facet, and a proposals facet. Decision frames for other applications include a similar set of corresponding relevant facets 102. In this way, computer-aided decision-making system 100 supports a variety of decision domains using the same or similar computational elements, methods, and basic user interface.

Further, computer-aided decision-making system 100 supports a variety of different frame types. Decision frames may be further subdivided into, for example, sub-decision frames or "decision-lite" frames to address different aspects of a single decision domain. An example of a sub-decision frame is a set of facets 102 that provide fuzzy-logic based enumeration of proposals or choices (as described herein) for a particular application, while other aspects of the decision domain are addressed by one or more other sub-decision frames (e.g., scripting or wizard "frames" for user interaction). In addition to decision frames and search frames, computer-aided decision-making system 100 also provides administration frames for, without limitation, managing logins and generating new facets; transaction frames for handling payment and price negotiation associated with purchasing, for referring a user to another electronic network or system in order to consummate a purchase, or for launching an agent (e.g., a daemon routine) to perform an online event-based monitoring or location service; report frames for generating reports as described herein; and customization frames for allowing a user to customize proposals (like the options for a car) and handle other details.

In a presently preferred embodiment, computer-aided decision-making system 100 supports collaboration among multiple users for a complex application by providing, among other things, rules that combine and contrast attributes of the decision states associated with a plurality of user perspectives. Thus, computer-aided decision-making system 100 supports multiple users in a multi-perspective decision context, such as, but not limited to, a development project in which the goals, requirements, and needs of a plurality of functional departments (e.g., marketing, engineering, finance, manufacturing) influence the decision and certain sub-decisions. For such an application, computer-aided decision-making system 100 provides each user of a plurality of users an individual decision state comprising the items described herein. Further, as the decision context becomes more complex, and the number of users in a given user session increases, the number of advocates 101 may be reduced such that one or more advocates 101 is removed from the display (reference FIG. 1A) and replaced with a similar interactive presence associated with one or more other users. As advocates 101 are designed to, as a minimum, serve as knowledgeable experts in their respective domains, the addition to the user session of actual users, wherein each user provides his own perspective or expertise to the decision/sub-decisions, supplants the function provided by an advocate having the same or similar perspective or expertise. The same type and degree of interaction and function provided by computer-aided decision-making system 100 between advocates 101 and a user are provided between a plurality of pairs of multiple users. It is to be understood that this increases the complexity of the each decision state as well as the number and complexity of rules defining the relationships among a plurality of decision states.

Further, computer-aided decision-making system 100 provides rules for tracking and refining the evolving decision states of a given user across a plurality of sequential user sessions such that relevant user choices and information learned by the system are reflected in the system-generated choices presented to the user in subsequent user sessions. Thus, computer-aided decision-making system 100 develops and uses information learned through repeated user interaction with the system in increasing the relevance and user preference of user-generated choices in future user sessions, thereby saving the user time in arriving at a decision/sub-decision. However, other advantages provided by computer-aided decision-making system 100 as described herein may be had by a user during only one such user session (i.e., a plurality of user sessions is not required).

Figure 5:
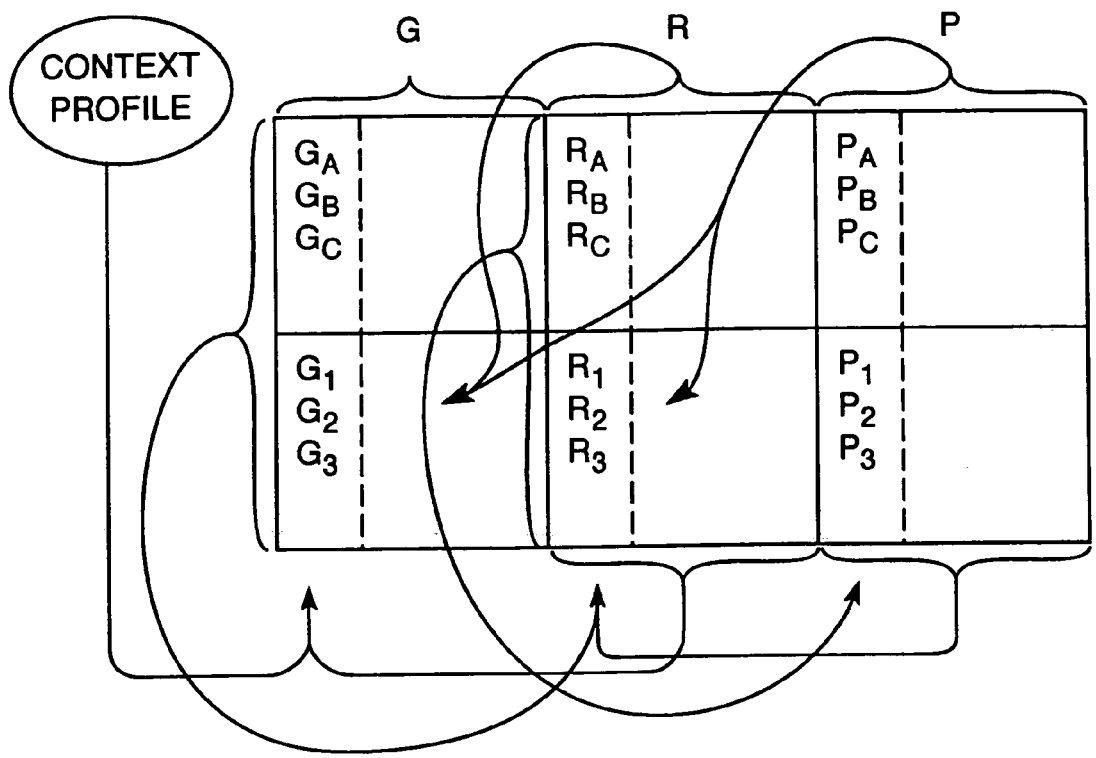
FIG. 5 illustrates the hierarchical relationship between facets.

In a presently preferred embodiment, facets 102 are hierarchically related such that the user-made attributes of choices in facets associated with more general information and sub-decisions are reflected in the system-generated attributes of choices in facets associated with more specific information and sub-decisions; that is, computer-aided decision-making system 100 reflects, in the categorical information of more specific facets, the user-made choices established during the course of determining values for choices presented for one or more general facets (recall that facets become associated with more specific information moving from left to right in FIG. 1A). Conversely, user input and decisions/sub-decisions (i.e., user made choices) for a particular facet are propagated backward by computer-aided decision-making system 100 to update corresponding choices established in preceding, or more general, facets. This relationship between facets is illustrated in FIG. 5. To facilitate user interaction and visualization of this relationship between sub-decisions and choices within and among facets, each facet 102 may contain one or more panes; preferably, a facet contains two panes. By way of example, referring to FIG. 1A, the price, style, location, schools, and services descriptive columns listed in lower pane 105 of the Houses facet reflect requirements established by computer-aided decision-making system 100, preferably through user interaction, in the "adjacent" preceding (i.e., more general) Requirements facet. Similarly, again referring to FIG. 1A, the investment descriptive column listed in lower pane 105 of the Houses facet reflects requirements established by computer-aided decision-making system 100, preferably through user interaction, in the preceding Goals facet. In this example, although the sub-decision choices established at the Goals level is of a more general nature than the specific requirements sub-decision choices established at the Requirements level, both sub-decisions are reflected in the more-specific Houses facet. From the user's perspective, the choices in the lower pane of a facet that addresses more specific decisions/sub-decisions reflect the user-made choices as captured in the upper pane of one or more facets that address more general decisions/sub-decisions. Further, choices may be moved from one facet to another. FIG. 5 is illustrates this particular hierarchical relationship between facets, particularly as applied to adjacent facets.

Referring to FIG. 6, in a presently preferred embodiment, the rows $R_1$, $R_2$, and $R_3$ of $Facet_1$ are transposed to form the columns $C_1$, $C_2$, and $C_3$ of $Facet_2$. Similarly, the rows of $Facet_2$ are transposed to form the columns of $Facet_3$, and so on. This transversal folding behavior, as illustrated in FIG. 6, exemplifies one of a plurality of inter-facet rules of a presently preferred embodiment of computer-aided decision-making system 100. Inter-facet rules may take the form of multi-dimensional spatial relationships among multiple facets 102 and their contents. Computer-aided decision-making system 100 determines an appropriate set of inter-facet rules of suitable complexity based on detailed analysis of the particular decision context or application. Further, in a presently preferred embodiment, computer-aided decision-making system 100 determines dynamically which of the attribute categories to include in the system-generated choices (i.e., system-generated attributes) for a particular facet based upon actual preference information obtained from the user and predicted preference information determined by the system. Computer-aided decision-making system 100 selects system-generated attributes for facets that address more specific decisions/sub-decisions from among a plurality of attribute categories, or made choices, associated with facets that address more general sub-decisions. In an alternative embodiment, upon user request computer-aided decision-making system 100 will maintain the currently-selected system-generated attributes for a particular facet, instead of dynamically varying them. Similarly, in a presently preferred embodiment, computer-aided decision-making system 100 will present the system-generated attributes associated with each facet in order of importance in a manner consistent with other aspects of the present invention; i.e., leftmost and uppermost placement indicating higher relative importance. Further, computer-aided decision-making system 100 includes rules providing for aggregation of attributes, or otherwise creating relationships between attributes, according to the complexity of the application (e.g., simple attributes may be combined for simpler applications). Computer-aided decision-making system 100 also includes tuning rules to promote uniformity across multiple applications as well as across multiple topics and multiple frames within an application.

Analysis engine 330 preferably further comprises an articulation engine for generating advocate 101 responses to the user via a preferred user interface according to a pseudocode implementation contained in the xference articulation engine. In the user interface, persons point to advocates that have something to say or to move to a report zone. This is called "advocate pointing". When analysis engine 330 determines an anomalous user input or choice as described herein, articulation engine generates one or more advocate articles (e.g., responses such as text displayed in a comment box, advocate appearance, multimedia output) according to a predetermined article descriptor. Specific article types that may be provided by an advocate include, but are not limited to, article descriptors designed to address the following situations: conflicting choices within different facets, not enough information in a facet for the decision to progress, suggestions, explanations, proclamations, encouragement, discouragement. Articulation is provided at a variety of levels of abstraction, including, but not limited to, the attribute level, the choice level, the facet/gauge level, the frame level, the decision level, the profiling level, and the process/system level.

In a presently preferred embodiment, each facet 102 is associated with a plurality of reports 103 and a plurality of panes comprising an upper pane 104 and a lower pane 105. The particular set of reports 103 and content of upper pane 104 and lower pane 105 associated with a given facet 102 is displayed to the user when the user selects that particular facet. For example, the reports 103 associated with the Houses proposal facet are as in indicated in FIG. 1A. Reports 103 may convey a wide variety of further useful or related information, taken from many different perspectives, associated with the selected facet 102. For example, upon user selection of the Reject report (reference FIG. 1A), computer-aided decision-making system 100 provides a report indicating the choices explicitly rejected by the user. In an alternative embodiment, user rejections are indicated to the user in a third pane of a facet 102, in which the order of the rejected choices indicates the relative strength of the user's rejection of a choice relative to other rejected choices. In another example, upon user selection of the Map report for a particular choice (reference FIG. 1A), computer-aided decision-making system 100, in a preferred embodiment, provides a map and driving directions associated with that choice. User report selection means may include, but is not limited to, using a computer mouse device to drag a choice from upper pane 104 or lower pane 105 to the desired report icon in order to select the associated report. It is apparent from FIG. 1A and the elsewhere herein that many different types of reports are provided.

Further, the reporting capabilities of computer-aided decision-making system 100 are not limited to reports 103 associated with particular facets 102. Generally, computer-aided decision-making system 100 provides reports containing more detailed information upon user selection of any one of a plurality of the displayed items as indicated in FIG. 1A including, for example, but not limited to, decision gauges, advocates 101, and choices.

Referring to FIG. 1A, for any facet 102 the lower pane 105 comprises a scrollable list of possible choices for a particular facet 102. Each line in lower pane 105 (and upper pane 104) represents one choice. Each choice contained in lower pane 105 has a surrogate value. These surrogate values are produced by the computer-aided decision-making system in response to user and external input and information as disclosed herein. Lower pane 105 contains all the choices relevant to this facet of the this decision. Each listed choice in lower pane 105 includes a plurality of attributes associated with that choice.

Further, in a presently preferred embodiment, each of these choices is ranked relative to the other choices in lower pane 105 and displayed in descending order of preference by computer-aided decision-making system 100. In lower pane 105, and, generally, for any system-generated displayed information, choices (or items) are presented in order of preference such that the uppermost and leftmost choices indicate a higher level of preference relative other choices. Computer-aided decision-making system 100 uses preference information provided by the user in ranking the choices in lower pane 105. Alternatively, if no user preference information is provided, computer-aided decision-making system 100 applies information from external sources, for example, but not limited to, demographic or statistical information, in ranking the choices in lower pane 105. In an alternative embodiment, computer-aided decision-making system 100 periodically adjusts the ordering of system-generated choices at a user-determined frequency or upon a event happening. In a preferred embodiment, computer-aided decision-making system 100 will update the ordering of system-generated choices upon user command (churn button).

Referring to FIG. 1A, upper pane 104 contains the choices that the user has made or is considering for a particular facet 102. The user may promote a choice from lower pane 105 into upper pane 104 by a variety of means, including, but not limited to, using a personal computer mouse device to select and drag a choice from lower pane 105 into upper pane 104. Conversely, a user can demote a choice from upper pane 104 to lower pane 105 using similar means. A choice that has been promoted (i.e., a user-made choice) is present only in upper pane 104 and ceases to be present in lower pane 105 following promotion. However, in the Topics facet, a promoted choice does not remove the choice from lower pane 105. A choice that has been demoted is only present in lower pane 105. Upper pane 104 comprises the user's "short list" of preferred choices selected (i.e., promoted) by the user from among the list of preferred choices generated by computer-aided decision-making system 100 contained in lower pane 105. Each of these choices is ranked relative to the other choices in upper pane 104 and displayed in descending order of user preference. Further, computer-aided decision-making system 100 extracts information concerning the features associated with choices promoted by the user and uses this extracted information to refine and reorder the set of possible choices contained in lower pane 105 to increase the likelihood that further system-generated choices in lower pane 105 will more closely conform to the user's ultimate overall preferred choice. In this way, as well as through other means described herein, computer-aided decision-making system 100 guides the user quickly and efficiently to her preferred choices from among a plurality of possible choices.

In a presently preferred embodiment, computer-aided decision-making system 100 uses a look-ahead function to elevate the relative ranking of certain choices (i.e., elevated choices) with respect to other choices indicated in lower pane 105 based on the presence of one or more distinguishing attributes associated with the elevated choices. Computer-aided decision-making system 100 determines the distinguishing attributes by applying the look-ahead function to identify attributes for which user feedback, if received by computer-aided decision-making system 100, would be helpful and meaningful to computer-aided decision-making system 100 in refining and reordering the ranked plurality of choices in lower pane 105 such as to increase the likelihood that further system-generated choices in lower pane 105 will more closely conform to the user's ultimate overall preferred choice. In this way, computer-aided decision-making system 100 solicits user input and uses this user input to further narrow the decision space of possible choices presented to the user in lower pane 105, as well as to suppress cumulative choices that are less preferred by the user and from which computer-aided decision-making system 100 can learn nothing further about the user's true preferences. Criteria used by the look-ahead function to determine distinguishing attributes may include, but is not limited to, attributes for which no user preference has been provided by the user, attributes for which user feedback may allow computer-aided decision-making system 100 to exclude a large number of possible choices, and attributes for which conflicting user information currently exists. In this way, as well as through other means described herein, computer-aided decision-making system 100 helps the user to converge quickly and efficiently to her preferred choices from among a plurality of possible choices.

Rules embodying relationships between choices, or "rulettes," are another aspect of the present invention that help to efficiently eliminate undesirable choices. For example, in an automobile-buying application, computer-aided decision-making system 100 includes a rulette relating driver age to purchaser needs such that, for example, if the user indicates that the driver is an elderly person, then the correlation score for "transporting children" is decreased as a needs or requirements choice input. Rulettes are application-specific.

A user may "drill down" to view more detailed information associated with a choice by requesting additional detail concerning that choice through, for example, but not limited to, using a personal computer mouse device to select the choice. As described earlier, computer-aided decision-making system 100 provides more detailed information upon user selection of any one of a plurality of the displayed items as indicated in FIG. 1A including, for example, but not limited to, decision gauges, advocates 101, and choices. In the context of a choice, upon user selection of a particular choice, computer-aided decision-making system 100 reports detailed information associated with that choice (i.e., sub-choices). For example, in an exemplary home purchase decision application, upon user selection of a choice, computer-aided decision-making system 100 extracts, formats, and reports detailed information associated with the particular choice obtained from a plurality of databases 301.

Further, computer-aided decision-making system 100 generates a choice topology by further decomposing choices into multiple sub-choices. Sub-choices may be grouped into "containers" of sub-choices, wherein the associated decision state of each sub-choice in a container is able to be viewed together by a user along with all other sub-choice decision states in the container. Preferably, computer-aided decision-making system 100 includes various types of containers, including, but not limited to: topics, super-choices, variable sets, weak groups, and strong groups.

For topics containers, topics may be singly or multiply instantiable (i.e., only one or multiple instances of the same decision). A topic choice has no q-value in the lower pane. Once a topic is promoted, it will "prompt" for a document name, and from there on, this name will be treated like a filename in OS. (E.g., no duplicates, etc.) A topic may have some sub-choices in the lower pane. Selecting a sub-choice for promotion results in the same behavior as selecting the container (prompt for name, etc.), except the initially visible frame will be the sub-choice. For example, in an exemplary home-purchasing application, a sub-choice may be "select a neighborhood". If the user selects this sub-choice, then an empty "find a home" decision will be generated to hold the neighborhood decision. The system may add other sub-choices to a topic as a result of the user's action. For example, transactions that are saved by the user will appear as sub-choices in the topic. Such dynamically generated sub-choices will not be present in the lower pane.

For super-choice containers, the container and the sub-choices stick together. The container and the sub-choices are singly instantiable. The sub-choices are not selectable. Usually, there are associated aggregation and segregation functions.

Some container choices may chose to only show a subset of their sub-choices. A visual UI mechanism, variable set enumeration, may be employed to allow expansion of other choices, or browsing of the "hidden" ones. Some applications of this technique are: 1) For lengthy enumerated lists, in a separate frame the user will decide the choices that he does or does not want to be considered and all other choices will not be normally seen in the container; and 2) Proposals in the proposal containers. For example, in an exemplary automobile-purchasing application, proposals may be ranked as groups of make-model. Under each make-model container, all the trims are listed by rank. If all possible trims are listed, then the upper portions the lower pane is wasted on proposals that may be ranked much lower then trims in the lower make-model containers. With variable set container feature, each container will only show the choices that are worthy of their location. Lower ranked sub-choices will be "hidden", but the user can expand the container to see the hidden choices.

For weak group containers, the container is not promotable nor liberal in its scope. All sub-choices are singly instantiable. This is the preferred container for the proposal facet.

Strong group containers are described as follows. In either pane, if a single choice is promoted/demoted, then if the container does not exist in the new pane, it is created, and the single choice is added to it; second and consecutive choices are just added to the existing container in the target pane, and, if the only choice in a container is removed, the container disappears. In the Lower Pane, the container choice has no q-value, the container choice is selectable, and if the container choice is promoted/demoted/excluded, then the container and all of the sub-choices are promoted/demoted/excluded. In the Upper Pane, as long as all the sub-choices are not promoted, the container choice displays a drop-down menu with the unpromoted sub-choices plus "—Select another—"choice. When closed, the drop-down displays the Select another choice. If a sub-choice is selected from the drop-down, then it is promoted, and added to the end of the container, displaying the surrogate q-value. If the user selects "I don't know" in a sub-choice, it will be demoted.

In the case of Super Choices and Variable Sets, the container and all the sub-choices are a single logical choice. The sub-choices are merely a mechanism to provide an elaborate mechanism for specifying q-values. Therefore, only the container has an influence.

For Weak Groups and Strong Groups, the container is not a logical choice, and all the sub-choices are. Therefore, all the sub-choices have their individual influences, and the container has no influence of its own, but it usually assumes the influence of its most influential sub-choice.

Each choice contained in the upper pane 104 and lower pane 105 is scored by a plurality of decision gauges 106 that indicate relative completeness in satisfying the user's goals and requirements. As indicated in FIG. 1A, in a presently preferred embodiment, decision gauges 106 are provided for advocates 101, facets 102, choices in upper pane 104, and choices in lower pane 105. In a presently preferred embodiment, decision gauges 106 are also provided for each advocate opinion and each attribute associated with each made choice in upper pane 104. A user may interrogate a decision gauge 106 to view more detailed information associated with it by requesting additional detail concerning that decision gauge in the manner indicated above (e.g., selecting the decision gauge item). Upon user selection of a decision gauge 106, computer-aided decision-making system 100 reports, in human readable form, which may include, but is not limited to, graphical representation, additional detail concerning the current state of the first-layer rules, weighting, and values underlying the normalized numeric score represented by the current state of the decision gauge 106. Thus, a decision gauge report provides insight to the user regarding how computer-aided decision-making system 100 arrived at a particular decision gauge state. Further, the user may drill down deeper into successive layers of preceding rules, or "feeding" rules, associated with the decision gauge state to explore the chain of relationships (i.e., rules firing, antecedent conditions or rule predicates that are satisfied) between linked rules in different layers followed by computer-aided decision-making system 100 to arrive at the current decision gauge state.

FIG. 2 provides a functional block diagram of a presently preferred embodiment of computer-aided decision-making system 100. Referring to FIG. 2, an analysis engine 330 receives information in the form of merchant product data 310, shopper (i.e., user) profiles 311, expert systems 201, as well as answers, values, and preferences 202 from a "shopper" or user 204 of computer-aided decision-making system 100. Analysis engine 330 updates shopper profiles 311 and may provide information to an on-line store 203 based on information determined during a user session. In a presently preferred embodiment, analysis engine 330 interfaces to the on-line store 203 via XML; however, this interface may be achieved using other means such as, but not limited to, HTML or file exchange such FTP, or email or electronic network. Further, analysis engine 330 provides information to the user (e.g., shopper) 204 in the form of questions, advice, and suggestions 205 in the manner disclosed herein. In a presently preferred embodiment, user 204 interacts with computer-aided decision-making system 100 using a web browser.

Figure 3:
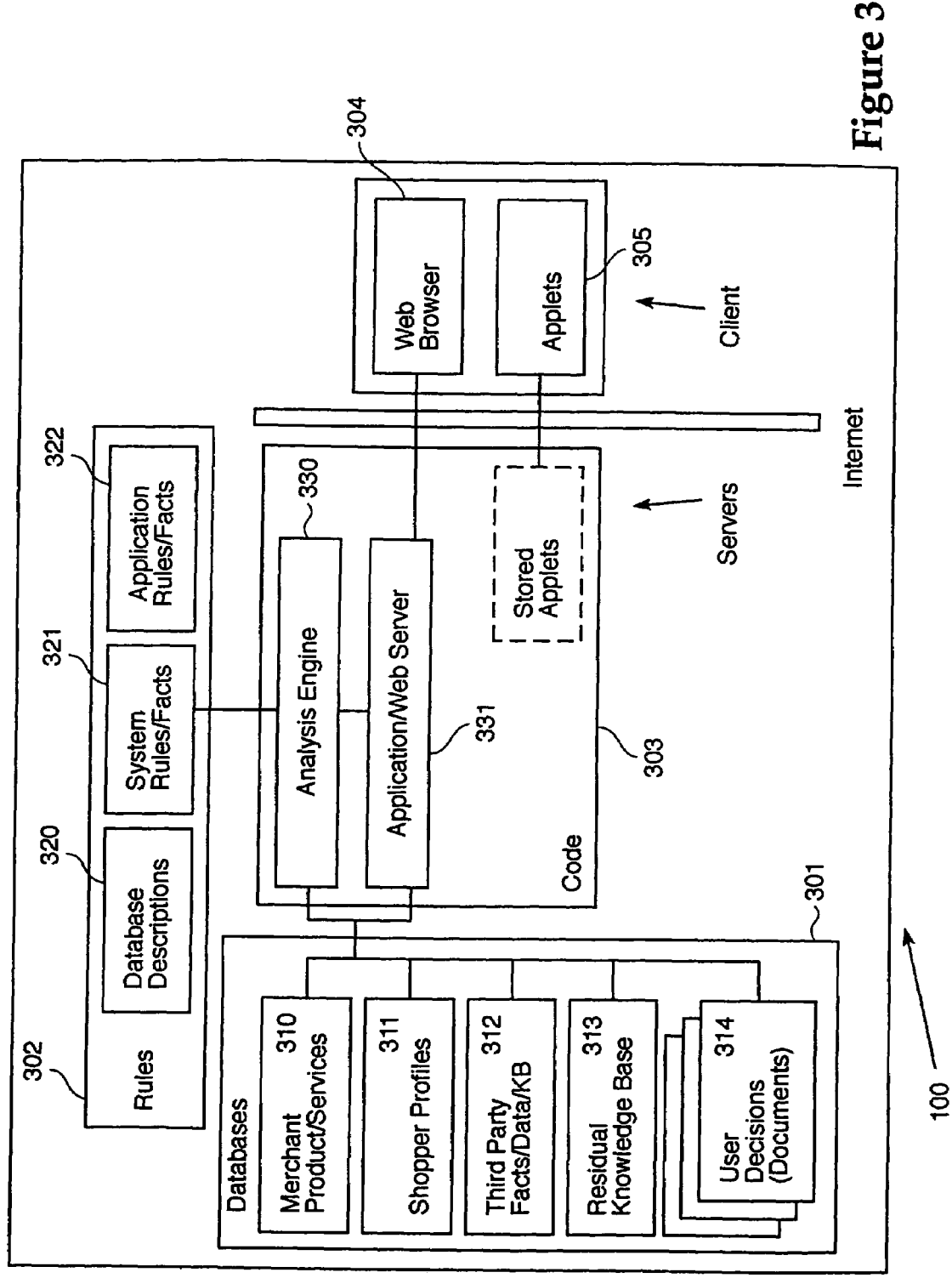
FIG. 3 is an architecture for a computer-aided decision-making system.

FIG. 3 illustrates an architecture for a preferred embodiment of computer-aided decision-making system 100, said architecture comprising databases 301, rules 302, code (i.e., software) 303 implementing analysis engine 330 along with server-side application/web server software 331, and a client-side web browser 304 and applets 305.

Referring to FIG. 3, the databases 301 comprise a merchant/products database 310, a shopper profiles database 311, a database comprising third party facts/data/knowledge base 312, a residual knowledge base 313, and user decision documents 314. One or more databases 301 may be encrypted for privacy.

The merchant/products database 310 contains detailed product or service information which is used along with other information by computer-aided decision-making system 100 to generate the surrogate values. The information in the merchant/products database 310 provides the set of possible choices from which computer-aided decision-making system 100 chooses in generating the surrogate values. In an exemplary on-line home buying purchase decision application, merchant/products database 310 includes detailed listing information on available houses which may be obtained, for example, from a plurality of realtors.

Shopper profiles database 311 comprises a repository of user profile information for individual users or customers of an on-line purchase system. User profile information may include, but is not limited to, personal information useful to computer-aided decision-making system 100 in generating a relevant set of surrogate values. Such information may include, for example, the user's age, the number and ages of her children, favorite colors, as well as other like information that computer-aided decision-making system 100 may use in generating the surrogate values. Significantly, a particular shopper profile of shopper profiles database 311, once established, may be reused by a plurality of applications in a plurality decision-making contexts that use computer-aided decision-making system 100. In a presently preferred embodiment, prior to the first time a particular user interacts with computer-aided decision-making system 100, shopper profiles database 311 contains a default set of user profile data based on demographic or statistical information. Further, computer-aided decision-making system 100 uses information obtained from the user during a user session to refine the values in shopper profiles database 311 associated with that particular user, and, further, to narrow the range of surrogate values provided to the user. Further, an advocate 101 may compare information provided by the user during a user session to corresponding information contained in shopper profiles database 311 to determine when to issue a report to the user as described herein.

Referring again to FIG. 3, third party facts/data/knowledge base 312 comprises other generally relevant information that is useful to computer-aided decision-making system 100 in generating surrogate values or advocate reports. In an exemplary on-line home buying purchase decision application, third party facts/data/knowledge base 312 may include, but is not limited to, neighborhood crime statistics, property tax rates, and the like.

Residual knowledge base 313 comprises a repository of user-discovered errata or desired modifications to the information contained in merchant/products database 310. A surrogate value listing produced by computer-aided decision-making system 100 may include information obtained from merchant/products database 310, which may later be determined by the user to be inaccurate. For example, in an exemplary on-line home buying purchase decision application, a particular surrogate value may indicate that the listed house includes a two-car garage. If the user subsequently determines that the house actually has a one-car garage, residual knowledge base 313 provides a means for the user to enter this updated information into computer-aided decision-making system 100 and to carry it forward for future user sessions.

User decision documents 314 comprise stored snapshots of the user session state taken at particular points in time upon user command. Each stored session state may be subsequently selected and viewed by the user as described in FIG. 1A, for example, such that the user may recall and reconstitute the earlier stored decision state of his user session.

Referring again to FIG. 3, rules 302 used by computer-aided decision-making system 100 comprise database descriptions 320, system rules/facts 321, and application rules/facts 322. Database descriptions 320 provide a mapping between the internal representation of information, as described herein, and the database location of the corresponding information in databases 301. System rules/facts 321 comprise decision rules that are application-independent and therefore common to all applications operating within computer-aided decision-making system 100. Examples of such common rules may include, but are not limited to, rules relating to how computer-aided decision-making system 100 decomposes decisions and how goal facets relate to requirement facets. Application rules/facts 322 comprise decision rules that are application-specific and therefore variable across different applications, including rules used by computer-aided decision-making system 100 to determine advocate 101 responses.

Referring to FIG. 3, in a presently preferred embodiment, analysis engine 330 is implemented in software that resides on a host server. Application/web server software 331 also resides on the host server. Analysis engine 330 decomposes the decision-making process into components and structures information relevant to the decision into decision frames to be used in producing suggested choices to a user in the manner described herein.

Analysis engine 330 extracts information relevant to the decision domain from databases 301, translates this information into a preferred internal representation according to the notation described herein as determined by the mapping provided by the database descriptions 320, applies system rules/facts 321 and application rules/facts 322 to the internal representation of the translated database information as well as to information received from the user through, for example, user interaction with the computer-aided decision-making system 100 through a web browser, to produce a plurality of system-generated choices. These system-generated choices are possible solutions to satisfy the user's decision/sub-decision. In a presently preferred embodiment, for the Requirements facet, computer-aided decision-making system 100 indicates system-generated choices relevant to a sub-decision in the form of surrogate values displayed to the user in the lower pane 105 of the Requirements facet (reference FIG. 1A). For the proposal facet (e.g., Houses facet), computer-aided decision-making system 100 indicates system-generated choices relevant to the decision in the form of proposals displayed to the user in the lower pane 105 of the proposals facet. Each system-generated choice is evaluated by analysis engine 330 using a preferred internal representation of the translated database information, as well as information received from the user, to arrive at an overall attributes preference score for that system-generated choice. Each system-generated choice is then ranked relative to other system-generated choices according to its attributes preference score and other factors including, but not limited to, its system-determined relative significance with respect to other such system-generated choices.

The attribute scoring process performed by analysis engine 330 for system-generated choices, as well as for advocate attribute scores and report attribute scores, is illustrated in FIG. 7, preferably using the notation described herein. This ranking is used to order the surrogate values and proposals provided to the user in lower pane 105 as described herein. Further, during the process of scoring and ranking a plurality of system-generated choices, analysis engine 330 resolves conflicting user information or selections to determine a single ordered list of a ranked plurality of system-generated choices. In a presently preferred embodiment, analysis engine 330 includes a similarity function that is used to determine the similarity between proposals as part of the scoring process. The similarity function operates by analysis engine 330 calculating the Euclidean distance between two proposals based on their attribute values, modulated by the influence of those attributes, preferably in the form of a weighted Hamming distance. Uncertain information or influence does not contribute (positively or negatively) to the distance. The values of the various attributes are normalized according to a cost associated with each attribute. Points of view are distinguished by the influence of the attributes (and, in some cases, their values).

In a presently preferred embodiment, computer-aided decision-making system 100 maintains the informational elements comprising choices according to the following formal notation.

Generally, a preferred choices and facet notation is described as follows:
1. Let a choice be denoted as "x".
2. All choices in an application domain are X.
3. All choices made by user "u" are $^uX$.
4. All choices in the Upper pane of facet "f" are $X_U^f$.
5. All choices in the Lower pane of facet "f" are $X_L^f$.
6. All choices in facet "f" are $X^f = X_U^f \cup X_L^f$.
7. A choice made by user "u" in the Upper pane of facet "f" is $^ux_U^f$.
8. The values of all choices made by user "u" in the Upper pane of facet "f" is $^uX_U^f[q]$.
9. The values of all attributes of a choice made by user "u" in the Upper pane of facet "f" is $^ux_{jU}^f[A[q]]$.
10. The time at which attribute "k" of choice "j" was modified by user "u" in the Upper pane of facet "f" is $^ux_{jU}^f[a_k[q[t]]]$.

Furthermore, users, facets, choices, and attributes are indexed according to a preferred notation as follows:
1. Users: $U \in u_1, u_2, \ldots u_h, u_{h+1}, \ldots u_H$
2. Facets: $F \in$ Philosophy, Environment, $\ldots f_i, f_{i+1}, \ldots$ Proposals, Customization $(=f_I)$ wherein the facet to the left of the current facet, "f" (or $f_i$), is the previous facet, "f-1" (or $f_{i-1}$). All facets to the left of the current facet, "f," are "f--". The facet to the right of the current facet, "f," (or $f_i$), is the next facet, "f+1" (or $f_{i+1}$). All facets to the right of the current facet, "f," are "f++".
3. Choices in a pane: $X \in x_1, x_2, \ldots x_j, x_{j+1}, \ldots u_J$ $$J^f = J_U^f + J_L^f$$

wherein the total number of choices in facet "f" is the sum of those in the upper and lower panes.
4. Attributes: $A \in a_1, a_2, \ldots a_k, a_{k+1}, \ldots a_K$ $$K^f = J^{f-1} = J_U^{f-1} + J_L^{f-1}$$

wherein the total number of attributes of a choice in a facet is usually the same as the number of choices in the previous facet.

A choice is comprised of various constant elements (or static elements), such as, for example, name, range, cost, question text, and answer text, as well as variable elements (or dynamic elements), including: qualified value, x[q]; influence, x[i]; and an attribute list x[A]. Thus, a choice is represented as:

$$^ux^f = {^ux^f[q, i, A]}$$

Further, a qualified value of a choice is comprised preferably of these variable elements: fuzzy value, q[v]; likelihood (certainty), q[l]; probability, q[p]; and time (age), q[t]. Thus, a qualified choice is represented as:

$$^ux^f[q] = {^ux^f[q[v,l,p,t]]}$$

The value of a choice depends on which pane it is in. The value used in the Lower pane is the surrogate value, $v_L$, and is set by computer-aided decision-making system 100. The value used in the Upper pane is the user-modified value, $v_U$, and is set by the User. The value $v_U$ is set to $v_L$ the first time the choice is promoted. Every choice (except a proposal) has an associated attribute that shares the same constant elements.

Every choice has an attribute list attached to it that shows its participation in the previous facet. That is, every choice $x^f$ can be described in terms of all the choices, $X^{f-1}$. Each facet contains a subset, $X^f$, of the total choices in the application domain, X. Each choice within a facet must be characterized by its participation in a set of attributes, $A^f$. The set of Attributes in one facet is identical to the set of choices in the previous facet:

$$A^f = [a_1, a_2, \ldots a_{KF}]^f = X^{f-1} = x_1^{f-1} + x_2^{f-1} + \ldots + x_{JF-1}^{f-1}$$

wherein each term indicates a choice type, such as "number of bedrooms", not a specific choice value within a pane or a specific attribute value within a choice.

An attribute is similar to a choice that has already been made and exists within the context of another choice; it merely has a qualified value, not an influence or attribute list:

$$a_k = a_k[q[v,l,p,t]]$$

The value of an attribute depends on which pane it is in. The value used in the Lower pane is the original value, $v_L$, and is set by configuration. The value used in the Upper pane is the user-modified value, $v_U$, and is set by the User. The value $v_U$ is set to $v_L$ the first time the choice is promoted. (Unlike a choice, the user will not modify the attribute value, in most cases.)

Facet action rules have the following notation. (The following rules assume a single user throughout.)

1. User Action $$X_U^f \leftarrow \text{user event}$$

$x[q]_U^f \leftarrow$ user event (including "it depends")

$x[i]_U^f \leftarrow$ user event wherein all choices promoted to an upper pane have their value and influence set explicitly by the user.

2. Surrogate Value $$X[q]_L^f = fn(X_U^{f++})$$

wherein default values in a lower pane are influenced by the choices in the upper panes of all facets to the right.

3. Next Choice
   a) Acyclic $$x_L^f[i] = fn(X_U^{f-1}, X_U^{f+1}, X_L^{f+1})$$

wherein the next choice ordering is influenced by the choices in the upper pane of the facets to the left and right (coherency terms) in competition with the choices in the lower pane of the facet to the right (look ahead term).
   b) Cyclic (May be Chaotic)

$$x_L^f[i] = fn(X^{f-1}, X_U^{f+1}, X_L^{f+1})$$

wherein the next choice ordering is influenced by all the choices in the facet to the left and the choices in the upper pane to the right (coherency terms) in competition with the choices in the lower pane of the facet to the right (look ahead term).

Consistency rules have the following notation:

1. Horizontal $$x_U^f[q] \leftrightarrow X_U^{f-}$$

wherein all choices promoted to an upper pane have their value checked for consistency with the choices in the upper panes to the left.

Inconsistencies are modulated (magnified) by the influence assigned to the choice (the $x[i]U^f$ term).

2. Vertical $$x_U^f[i] \leftrightarrow X_U^{f++}$$

wherein all choices promoted to an upper pane have their influence checked for consistency with the choices in the upper panes to the right.

A preferred scoring notation is as follows:
1. Let a score be denoted as "s".
2. All scores in an application domain are "S."
3. Scores can be created by any scoring entity including advocates, users, reports, and other functions of computer-aided decision-making system 100. Even other choices and the previous facet can be scoring entities.
4. Entities: $E \in A$ (advocates), U (users), S (system), R (reports), X (choices), F (facet)
5. All scores made by entity "e" are $_eS$.
6. All scores made by all entities on all choices made by user "u" in facet "f" are $^uS^f$.
7. All scores made by entity "e" on all choices by user "u" in the Upper pane of facet "f" is $^u_eS_U^f$.
8. A scores made by entity "e" on choice "j" by user "u" in the Upper pane of facet "f" is $^u_eS_{jU}^f$.
9. Entities can score elements of a choice, value, influence and Attributes, yielding a value score, s[q], an influence score, s[i], or an attribute score, s[A].

Scoring functions have the following notation:
1. Value Score (also referred to as "q-value"):

$$^u_eS_U^f[q] = fn(^ux_{jU}^f[q], ^ex_{jU}^f[q])$$

wherein the entity, "e", scores the "$j^{th}$" choice (of user, "u", in the Upper pane of Facet "f" as a function of the value of that choice compared to the scoring entity's version of that value.

An Advocate value score:

$$^ax_j^f[q] = ^a\text{Rules}(X_u^{f-})$$

wherein an advocate (or the system) generates its values for this choice based on the user's choices in the previous facets (including user profile), or possibly also based on the other user choices in this facet.

2. Influence Score:

$$^u_eS_U^f[i] = fn(^ux_{jU}^f[i], ^ex_{jU}^f[i])$$

wherein the entity, "e", scores the "$j^{th}$" choice (of user, "u", in the upper pane of facet "f") as a function of the influence of that choice compared to the scoring entity's version of that influence.

An advocate influence score:

$$^ax_j^f[i] = ^afn(^ax_j[A]^f, X_U^{f-1})$$

wherein an advocate (or the system) generates its influence for this choice by using its own attribute list for this choice to evaluate the user choices in the previous facet, or possibly also based on the user's choices in the previous facets (including user profile).

3. Attribute Scores: (assuming a single user throughout)
   a) Advocates and other users score attributes against their choices:

$$_aS_{jU}^f[A] = fn(x_{jU}^f[A], ^aX^{f-1}[q], ^aX^{f-1}[i])$$

wherein the advocate, "a", scores the "$j^{th}$" choice (in the upper pane of facet "f") as a function of the value of that choice's attribute values compared to the values and influences of the advocate's choices in its previous pane.
   b) Reports score attributes against their special functions, facts and the user's influences:

$$_rS_{jU}^f[A] = \text{report}(X_U^f[A], X^{f-1}[i], ^r\text{Facts})$$

wherein a report, "r", scores the "$j^{th}$" choice (in the Upper pane of Facet "f") as a function of that choice's attribute values, evaluated by it's special functions and facts and the user's influences.
   c) Choices score attributes against their values and the user's influences (i.e., billboarding):

$$_{xj}S_U^f[A] = fn(X_U^f[A], xf[A[q]], X^{f-1}[i])$$

wherein a choice "$x_j$", scores all other choices (in the Upper pane of Facet "f") as a function of the value of each choice's attribute values, compared to its values and the user's influences.

Ranking is performed in accordance with the following notation:
1. Let a rank be "r".
2. The rank of the "$j^{th}$" choice in the lower pane of facet "f" of user "u" is $^ur_{jL}^f$.

In the upper pane, ranking is set by the influence of the choice which is set by user. In the lower pane, ranking is set by the influence according to Facet rules.

In applying the rules to the database and user information, analysis engine 330 may employ a variety of computational techniques including, but not limited to, fuzzy logic, decision matrix, decision tree, laws of inference, first order predicate logic, calculus, neural networks, statistics, probability, utility theory, operations research, systems theory (e.g., LaPlace, Fourier), project management (resource leveling), prediction tools, or genetic algorithms. Analysis engine 330 applies the rules in successive layers such that intermediate rules are applied to produce intermediate values to feed the next layer, or succeeding layer, of rules in an iterative manner until one or more ranking values are obtained. Computer-aided decision-making system 100 uses this ranking value in the manner described above to determine a relative ranking of a plurality of choices. Further, computer-aided decision-making system 100 uses the ranking values to produce corresponding decision gauge states. In producing ranking values, analysis engine 330 uses the information contained in databases 301 and rules 302 to select the rules to be applied, perform iterative application of the rules, link the rules and establish their relationships, provide weighting of the input values that the rules operate on, and interpret the rules and their outputs. A rule "fires" when it has been selected, all required inputs or operands are available, and any preconditions to the rule have been satisfied. In a presently preferred embodiment, analysis engine 330 uses recursion in applying the rules using a fuzzy logic implementation as described herein.

In a presently preferred embodiment, rules are implemented in accordance with the pseudocode structure. Categories of rules provided by computer-aided decision-making system 100 include, but are not limited to, articulation rules, permutation rules, and rule engine rules. Articulation rules further comprise intrinsic behavior rules, education rules, humanization rules, sanity rules, humor rules, etiquette rules, user interface presentation rules, and processing rules. Intrinsic behavior rules are articulation rules that complement hard coded intrinsic behavior. Intrinsic behavior rules can further refine the intrinsic behavior of computer-aided decision-making system 100. Education rules educate and guide the user on subjects of decision making in general and the current decision document (e.g. "If the user is spending all his time in the Proposals facet, tell him to visit the other facets"). Humanization rules make computer-aided decision-making system 100 behave more human-like (e.g. "If you have already said something, then don't say it again"). Permutation rules set or modify the value of an object and include influence modifiers and surrogate value modifiers. Rule engine rules govern the behavior of analysis engine 330 and also serve to protect the integrity of the system against undesirable user or customer-added rules. Further, computer-aided decision-making system 100 includes a language generator that translates a particular rule into human understandable terms by presenting the rule (including, but not limited to, the rule antecedent, operation, and result) using conditional statements (e.g., "if", "then", "otherwise") to facilitate user understanding of the rule upon viewing it using the user interface.

Figure 4:
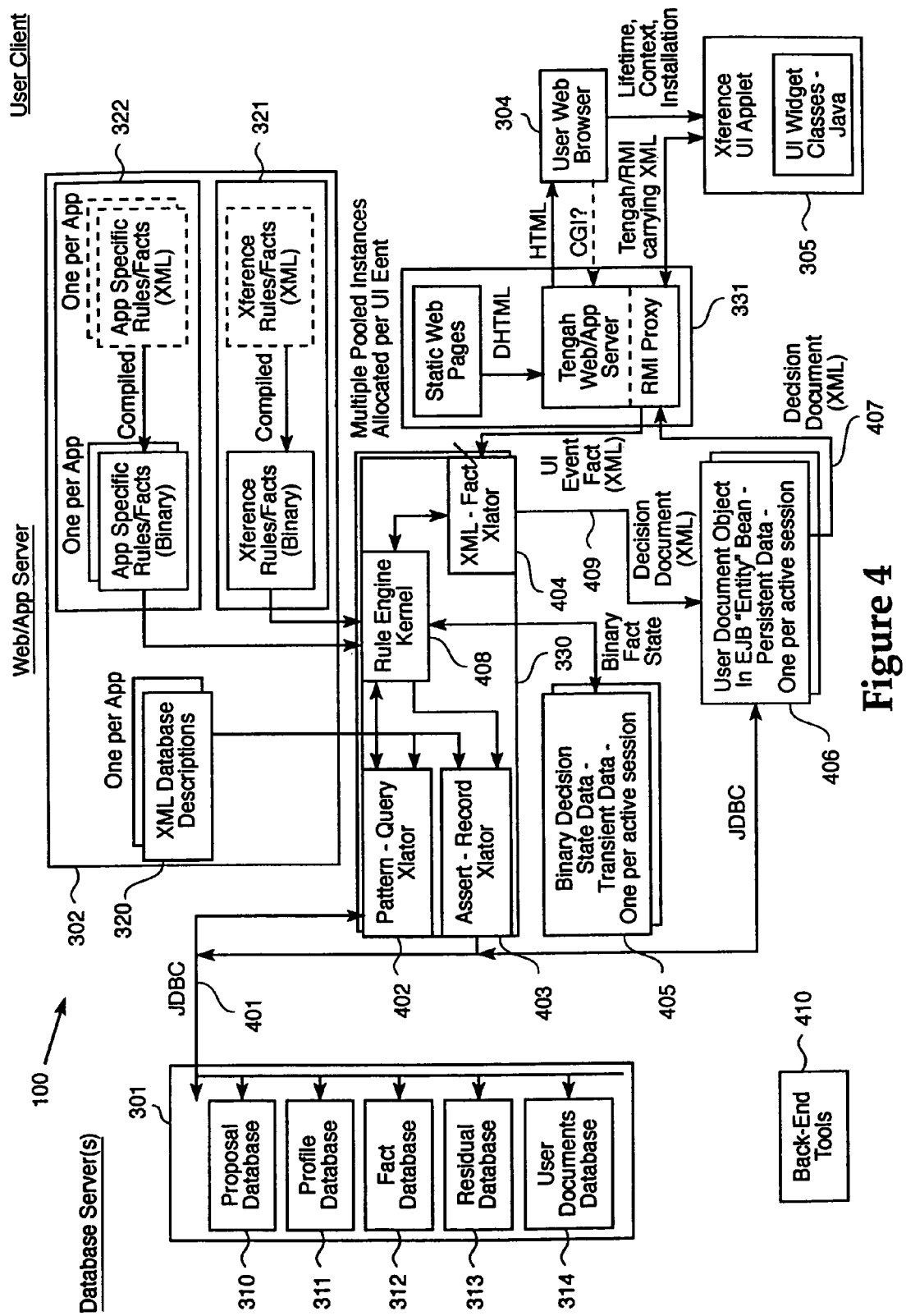
FIG. 4 is a functional block diagram of a preferred embodiment of a distributed computing based computer-aided decision-making system.

In a presently preferred embodiment, computer-aided decision-making system 100 is implemented using a distributed computing, client-server model as illustrated in FIG. 4 comprising databases 301, rules 302, web browser 304, server-side application/web server 331, applets 305, analysis engine 330, binary decision state data—transient data 405, a user document entity 406, and back-end tools 410. It is to be recognized that the present invention may be implemented using one or a combination of many different computing models and media including, but not limited to, standalone environments, networked environments such as company intranets or the Internet, shopping/retail kiosks, wireless networks including public or private communications systems or other use of radio and infrared links, personal digital assistants (PDAs), or other such devices and appliances.

Referring to FIG. 4, databases 301 may interface to analysis engine 330 via a database query language, C++, or any object oriented language. In a presently preferred embodiment, databases 301 interface to analysis engine 330 via JAVA Database Connectivity (JDBC) database query language 401. Analysis engine 330 uses a pattern-query translator 402 to translate standard-format database pattern query information into a corresponding internal representation for computation, and vice versa. Similarly, analysis engine 330 uses an assert-record translator 403 to translate into standard-format database record information a corresponding internal data representation (preferably as described herein), and vice versa. Analysis engine 330 includes a rule engine kernel 408 which provides the computational element as described previously. Analysis engine 330 uses an XML-fact translator 404 to translate internal fact representations into corresponding standard-format database records information for storage in computer memory of the user document object 406, and vice versa. User document object 406 includes information concerning a user session which may be stored in user decisions documents 314 database upon user command. Upon request from the user to retrieve a particular user session decision state as previously described, user document object 406 includes, but is not limited to, persistent data required to restore the then existing decision state of a user session. In a presently preferred embodiment, user document object 406 provides the persistent data to XML-fact translator 404 of analysis engine 330 via an XML interface 409.

Similarly, binary decision state data—transient data 405 includes binary fact state information associated with a user session which may be stored in user decisions documents 314 database upon user command. Upon request from the user to retrieve a particular user session decision state as previously described, binary decision state data—transient data 405 includes, but is not limited to, binary decision state data or transient data required to restore the then existing decision state of a user session. In a presently preferred embodiment, binary decision state data—transient data 405 provides binary decision state data or transient data to analysis engine 330.

Further, back-end tools 410 provide a development environment in which one of more domain experts can quickly develop application rules/facts 322 relevant to a specific application or decision context for use with computer-aided decision-making system 100. In a presently preferred embodiment, computer-aided decision-making system 100 maintains and applies inter-facet rules provided by user interaction with back-end tools 410.

Referring again to FIG. 4, in a presently preferred embodiment, database descriptions 320, application rules/facts 322, and system rules/facts 321 are provided in the XML mark-up language. Application rules/facts 322 and system rules/facts 321 are compiled into binary format for use by analysis engine 330. As indicated in FIG. 4, database descriptions 320 and application rules/facts 322 are associated with the application, while system rules/facts 321 are associated with analysis engine 330. Thus, each decision-making application may be associated with a unique set of database descriptions 320 and application rules/facts 322, while system rules/facts 321 are common to all applications operating within computer-aided decision-making system 100.

Figure 15:
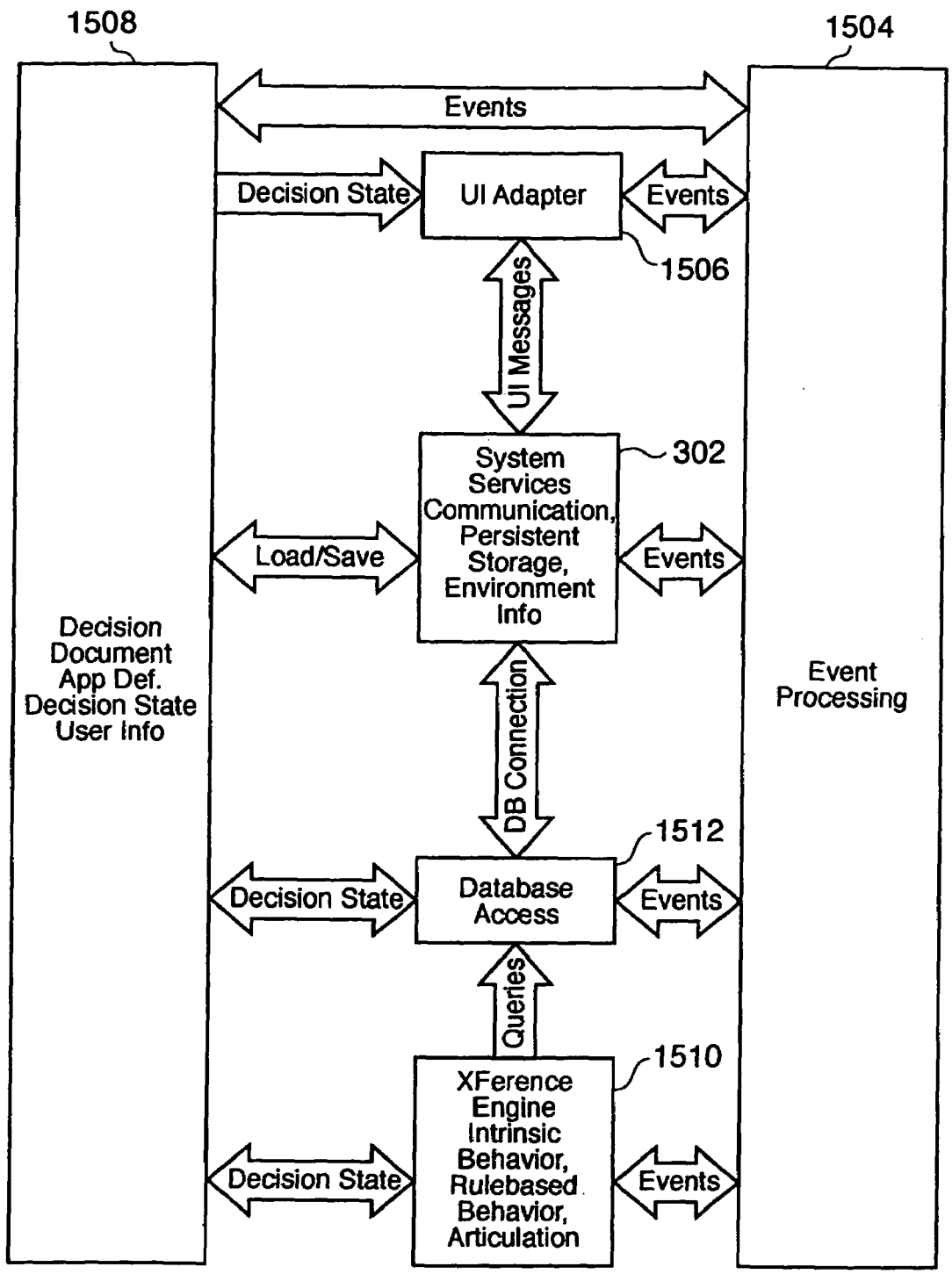
FIG. 15 illustrates a server-side application/web server implementation for event processing.
Figure 16A:
Figure 16E:
Figure 16G:
Figure 16I:
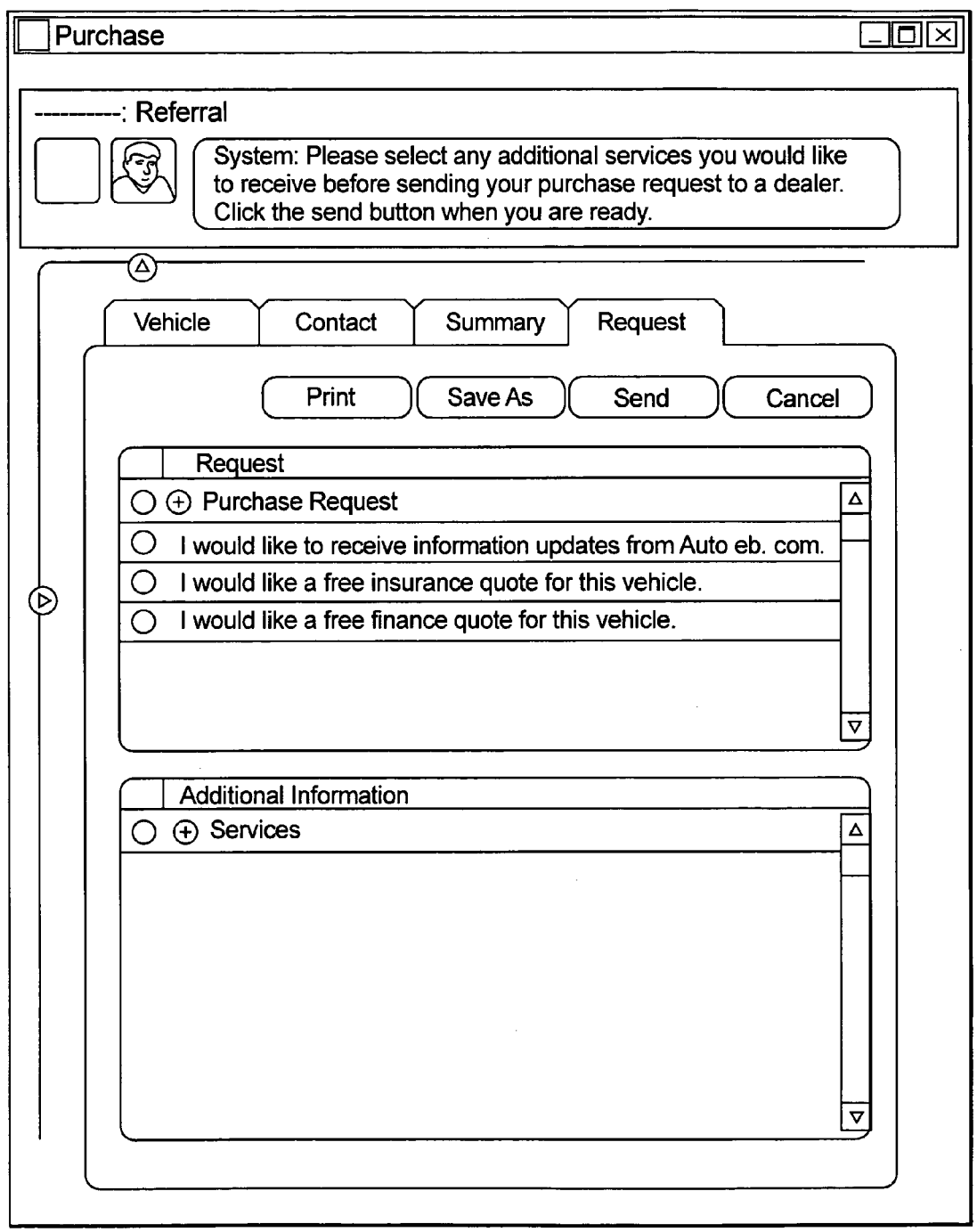
Figure 16J:
Figure 16K:
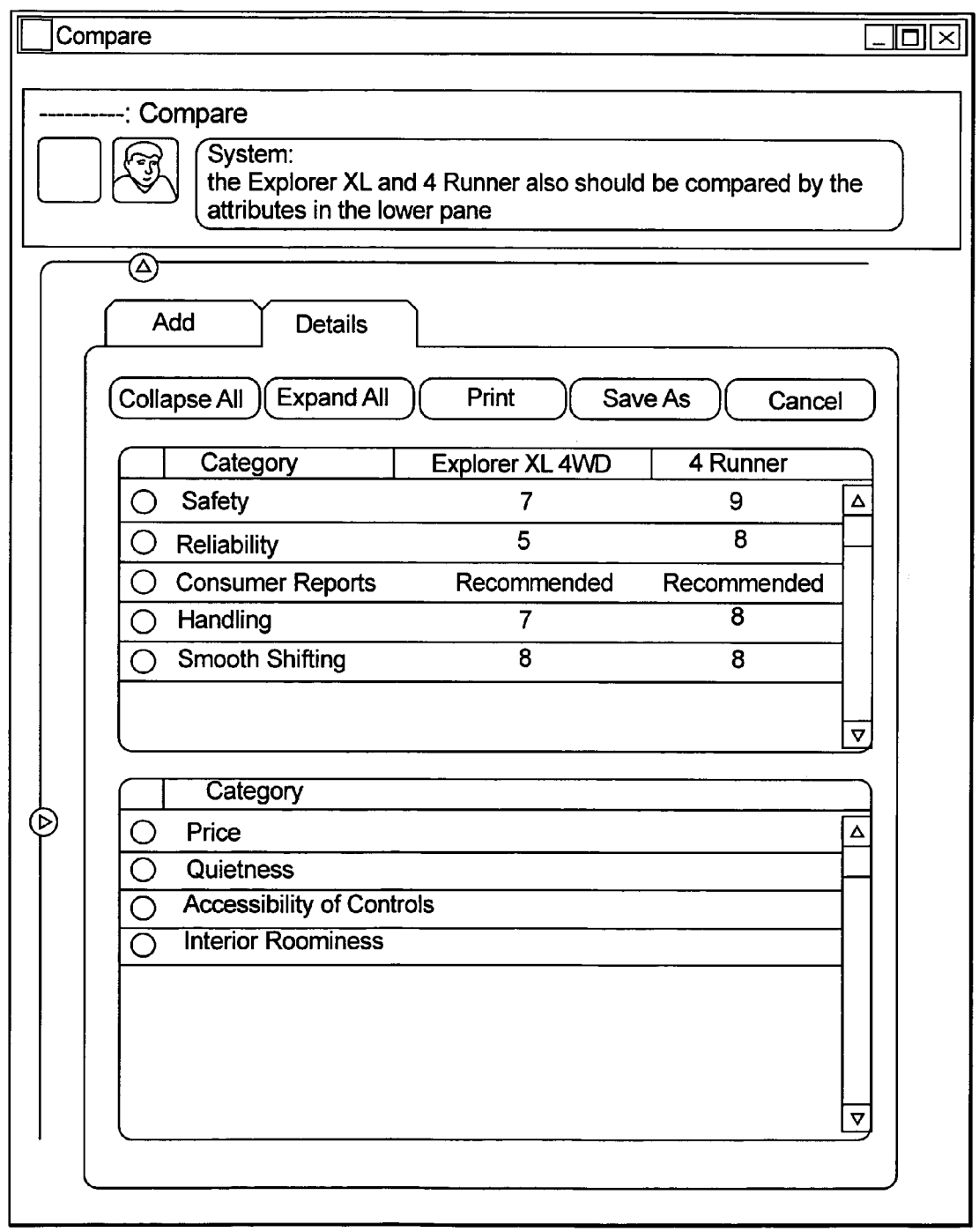

A presently preferred embodiment of server-side application/web server software 331 is implemented in accordance with the Enterprise Java Bean (EJB) architecture shown in FIG. 15, which will now be described in detail.

One or more Session Beans operate within the context of an Enterprise Java Bean (EJB) application server that provides communication, multi-tasking and database connectivity infrastructure. The user interacts with the session bean through a user interface, hosted in a user's web browser. The session bean manages long term data persistence in conjunction with one or more databases via EJB Entity beans or, more directly, via the Java Database Connectivity API (JDBC). To maintain implementation flexibility and accelerate development, a preferred architecture (reference FIG. 15) implements the server-side application/web server software 331 application as a number of distinct modules interconnected by simple, well defined, but flexible interfaces. In presently preferred embodiment, six modules are defined: System Services 1502, Event Processing 1504, User Interface Adapter 1506, Decision Document 1508, XFerence Engine 1510, and Database Services 1512. Intermodule communication and cooperation is implemented by three primary methods: events, method calls on module interfaces, and direct access to the decision document. Events are intended to offer a generic method of letting modules interact on an application wide basis while not rigidly encoding the details of that interaction in the individual modules themselves. Events operate as a messaging type system. Any module can originate an event, the details of which are encoded in an event object. The module then submits that event to the Event Processor Module 1504. The Event Processor 1504 then handles the high level sequencing and distribution of the event. Each module is offered a turn to veto an event, to process the event, and to act upon the combined results of the processing of all the modules.

Each module provides a well defined, flexible interface to facilitate communication with other modules. One group of interface methods is used to implement the event processing. This set of methods is common to all the modules. Further, some modules may offer specific services, or interact on a one-to-one basis. For example, the System Module 1502 provides the networking support to allow the client user interface to communicate with the application via the User Interface Adapter Module 1506. The User Interface Adapter Module 1506 implements a method that takes a serializable object as an argument and returns a serializable object as a result. The System Module 1502 simply handles the network connection, passes a generic argument and returns a generic result. The UI Adapter 1506 is responsible for interpreting the communication, taking the necessary action, and generating the correct response. The intent of the module interfaces is to implement a small number of methods that represent relatively generic functions that require little or no knowledge of the internal implementation of the module. This should allow developers to work relatively independently on the internals of the modules without requiring constant coordination and consultation with developers working on other modules.

The decision document requires intensive interrogation and modification by various other modules, and is also a shared data structure. Therefore, while the Decision Document 1508 implements the methods of the event processing interface, some modules preferably work directly on the internal objects of the document. The XFerence Engine Module 1510 reads and modifies the Decision Document 1508 extensively while it Churns, and the UI Adapter 1506 has to constantly re-read much of the Decision Document 1508 to update the UI 1506.

An event is submitted for processing by encoding its details in an XEvent object and calling this function on the Event Processor 1504. The Event Processor 1504 in turn calls this method on each of the modules to actually process the event. The order in which the modules are called may depend on the event type. While processing an event a module may submit a child event for immediate processing by calling processEvent on the Event Processor Module 1504 with the new XEvent object. Additionally, a module may submit an event for processing subsequent to the completion of the current event by calling the Event Processor's queueEvent method. Each module returns true from this method if its processing has affected the state of the Decision Document 1508 or false otherwise. Because of the difficulty of maintaining a consistent document state as multiple modules are modifying the Decision Document 1508, throwing exceptions during the processing of events is avoided. Instead, the validity of an event is thoroughly checked during the allowEvent processing before any module has modified the document.

The System Module 1502 creates and owns the root objects of each of the remaining modules. Only the Decision Document Module 1508 is persistent; all other modules should be designed so that all data or state information required to persist longer than the processing of a single event or method call is stored in the Decision Document 1508. The initialize and retire events can be used to control the creation and destruction of fields that can be generated dynamically.

The system services module offers a generic interface to "system" services including external communication, external data access and data persistence. Although a preferred implementation uses EJB's, it is straightforward to replace the EJB implementation with equivalent services based on a standalone user system (e.g. windows systems calls, file based persistence, etc.).

A Module within the Decision Document (BDS) encapsulates the working data for the decision. Saving and restoring the BDS completely restores the state of the decision application. The state offers two independent methods of persistence, Java serialization and XML loading/generation. The serialized data of either of these methods will be loaded/stored via the EJB Framework.

The Event Processor Module is the conduit through which actions are coordinated and dispatched. Action requests and event notifications may be submitted by or to any of the other main modules via the event processor. Processing of an event may generate child events in one of two ways: The child event may be processed immediately (i.e. within the context of an enclosing processEvent call) if submitted to the event processor by calling processEvent; alternatively, the child event may be processed subsequent to the completion of its parent if submitted by calling queueEvent. Regardless of the child event type, the child event processing starts with a veto polling cycle independent of the parent event vetoing. The vetoing of a child event has no automatic impact on the parent event. If the child event was of the immediate type the module that submitted the child may choose to return an exception from the processEvent call that was processing the parent event. Otherwise, the processing of the parent event continues normally. If the child message was of the queued type then the parent event has already completed and cannot be affected by the vetoed child event. A processing exception in a child event has the same effect as in its parent event. The contents of the Decision Document are considered invalid after a processing exception and the decision is rolled back to its last saved state with a possible associated data loss. For this reason it is recommended to only return exceptions from child event processing under the most sever circumstances. Child events and their parents all share a single docUpdatePerformed call cycle by the Event Processor. The method will be called with an argument value of true if the original event or any of its descendant events made changes to the Decision Document.

Events should be encoded in an implementation neutral format that does not reflect the particulars of the UI or the "operating system" (EJB). Events include, but are not limited to, Application Initializing Events, Start New Decision Event, End Decision Event, User Identification Event, Vendor Handoff Event, UI Events, View Selection, Facet Selection, Proposal Selection, Report Requests, Advocate Selection/Dismissal, Choice Promotion, Choice Q-Value Editing, Choice Demotion, and Choice Trashing.

The UI adapter encapsulates the communication and servicing of the user interface. Specifics of the user interface, messaging parsing, and UI data buffering are handled here. The UI Adapter interface is designed so that it can be easily replaced with alternative implementations, a Windows UI or DHTML, for example.

The Xengine module implements the core of the decision processing. It is initiated by events submitted to the Event processor, and may in turn submit events to the Event processor. It may also call directly on services of the Database Access module. The Xengine module comprises an Intrinsic Behavior Processor, XEngine Rule Based Behavior, and an Articulation Engine.

Database access is provided by the database services module. The external interface offers implementation neutral services for queries, proposal retrieval, etc. The interface is designed to function with and independently of JDBC, ODBC, or SQL specifications.

Finally, server-side application/web server software 331 provides miscellaneous utilities including an XML Parser and an XML Bridge.

In a presently preferred embodiment, applets 305 are implemented in the JAVA programming language. In a presently most preferred embodiment, databases 301, rules 302, analysis engine 330, binary decision state data—transient data 405, and user document object 406 are implemented in accordance with the EJB methodology. Further, back-end tools 410 support development of application rules/facts 322 in accordance with the EJB methodology.

Figure 9:
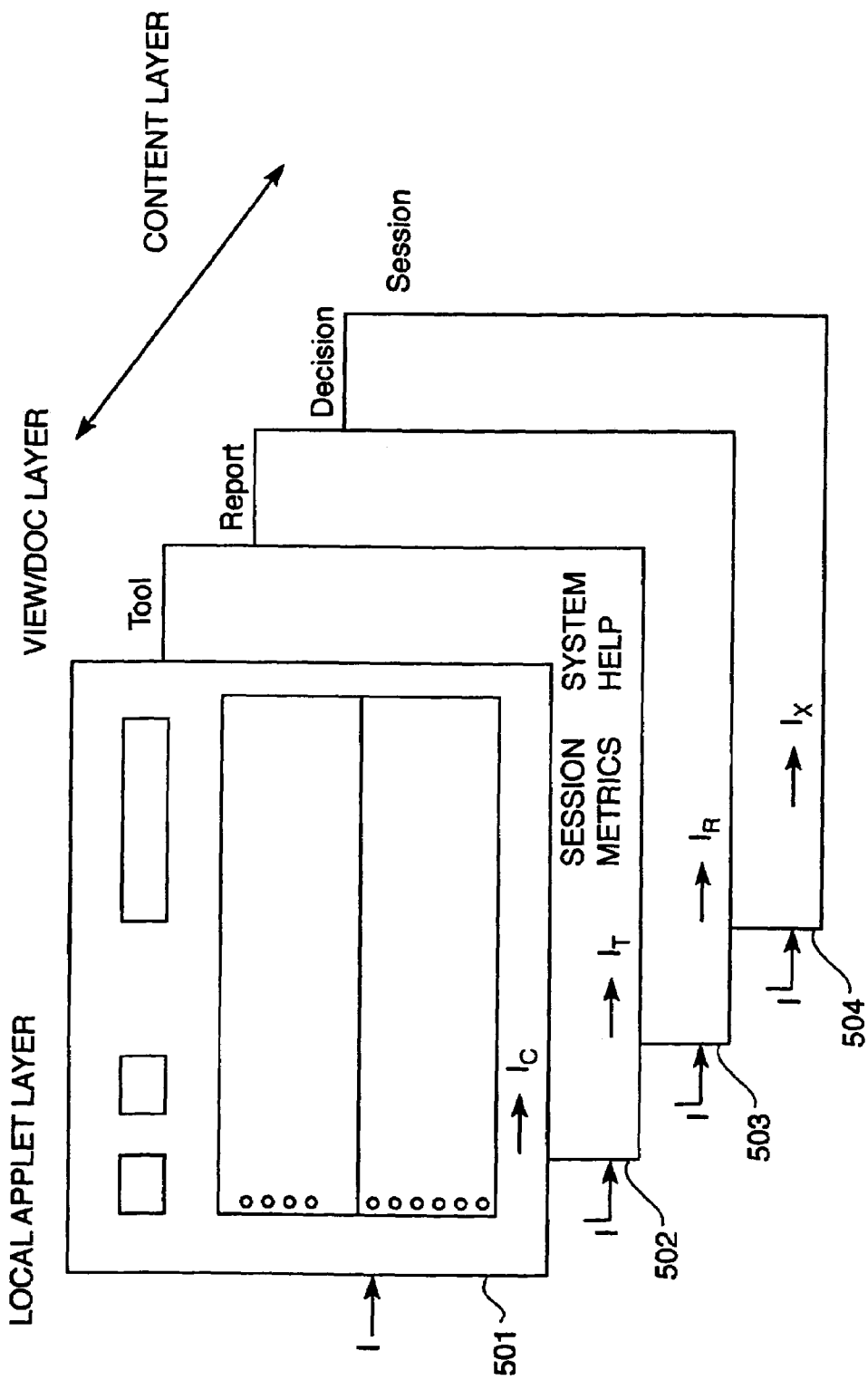
FIG. 9 describes a presently preferred embodiment of the computer-aided decision-making system implemented as a plurality of execution layers.
Figure 10:
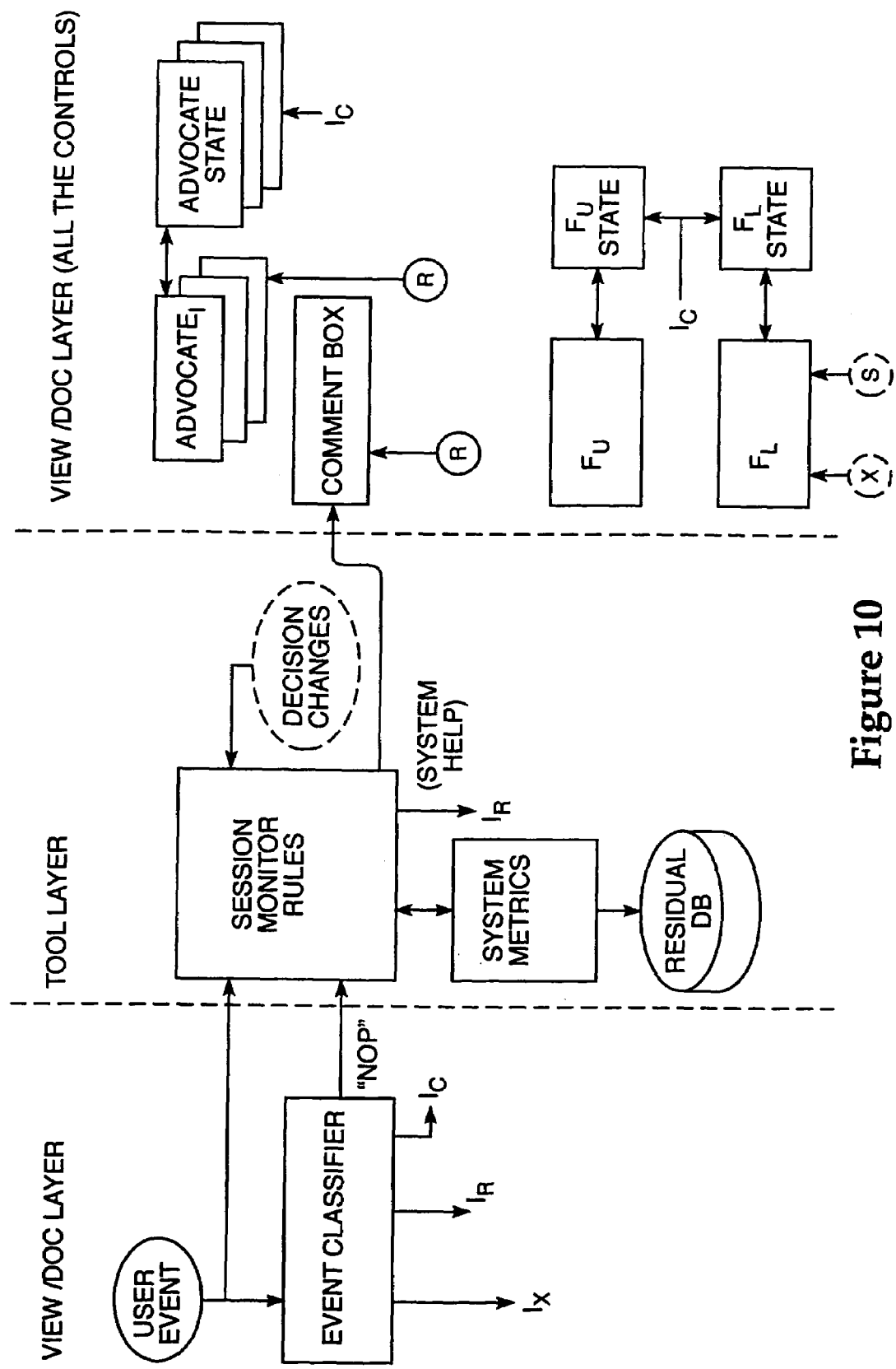
FIG. 10 describes interaction between the user/doc layer and tool layer of the computer-aided decision-making system.

Referring to FIG. 9, in a presently preferred embodiment, computer-aided decision-making system 100 is implemented as a plurality of execution layers comprising a view/doc layer 501, a tool layer 502, a report layer 503, and a decision layer 504. View/doc layer 501 interacts with the user during one of a plurality of user sessions with computer-aided decision-making system 100 in the manner described herein. FIG. 1A provides a detailed illustration of a presently preferred user interface for computer-aided decision-making system 100. Tool layer 502 monitors the interaction between the user and computer-aided decision-making system 100 for such purposes as compiling session metrics (which may be stored in residual database 313), determining when the user may require system help, and, generally, observing how the user interacts with computer-aided decision-making system 100. In a presently preferred embodiment, computer-aided decision-making system 100 develops a plurality of session monitor rules, based on compiled session metrics, that computer-aided decision-making system 100 uses to adjust or customize certain characteristics of the user interface (i.e., view/doc layer 501) for user sessions with that particular user. For example, if a user repeatedly ignores or mutes a particular advocate 101, computer-aided decision-making system 100 may raise the threshold parameter associated with that advocate in order to limit responses from that advocate, or computer-aided decision-making system 100 may decrease the influence score for that advocate, or any combination of these two actions. FIG. 10 illustrates these aspects, as well as other aspects, of user/doc layer 501 and tool layer 502 and interaction occurring therebetween. In FIG. 10 and elsewhere, choices are denoted by the symbol "X" and scores are denoted by the symbol "S".

Figure 11A:
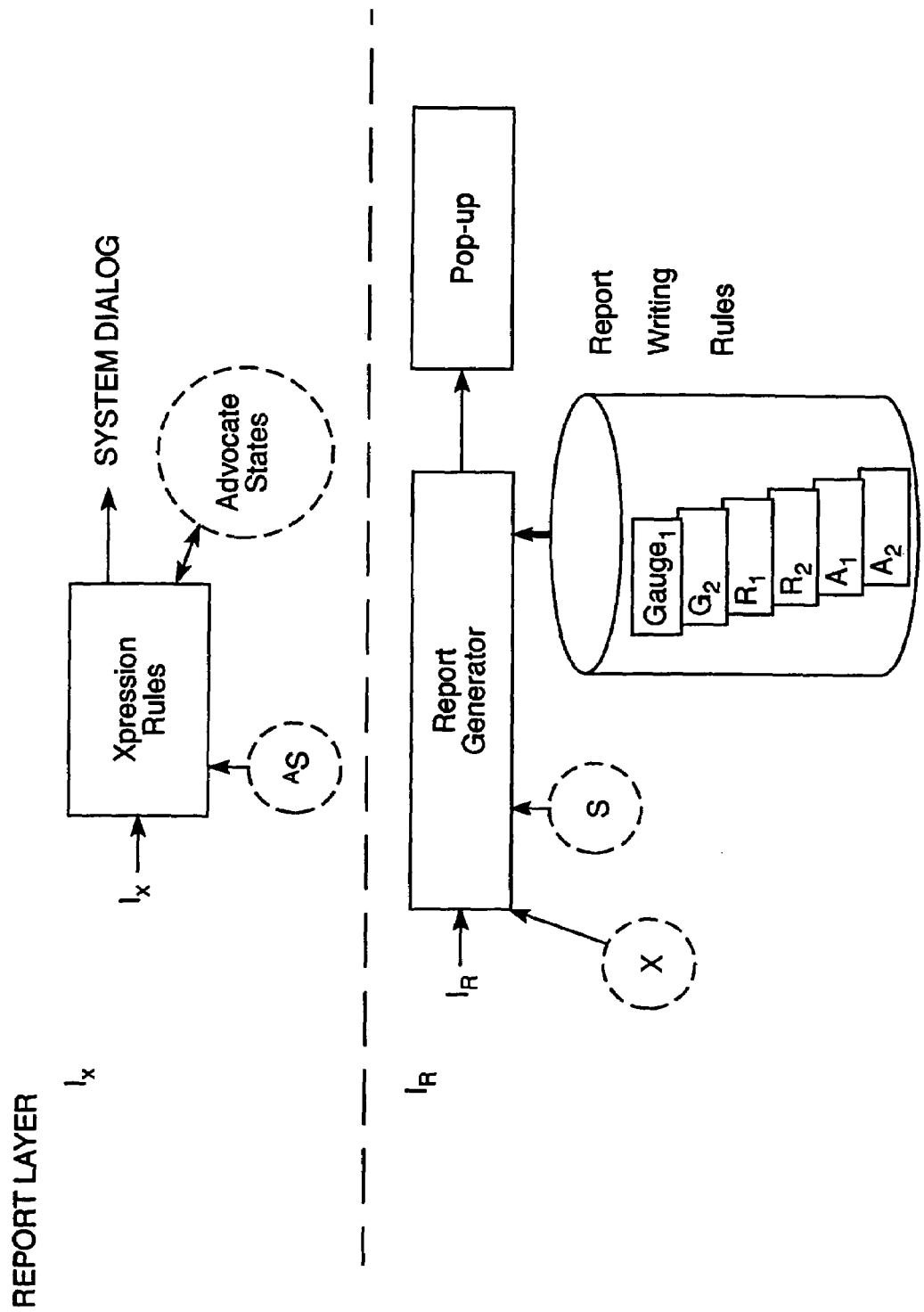
FIGS. 11A and 11B illustrate report generation activities of the computer-aided decision-making system.
Figure 11B:
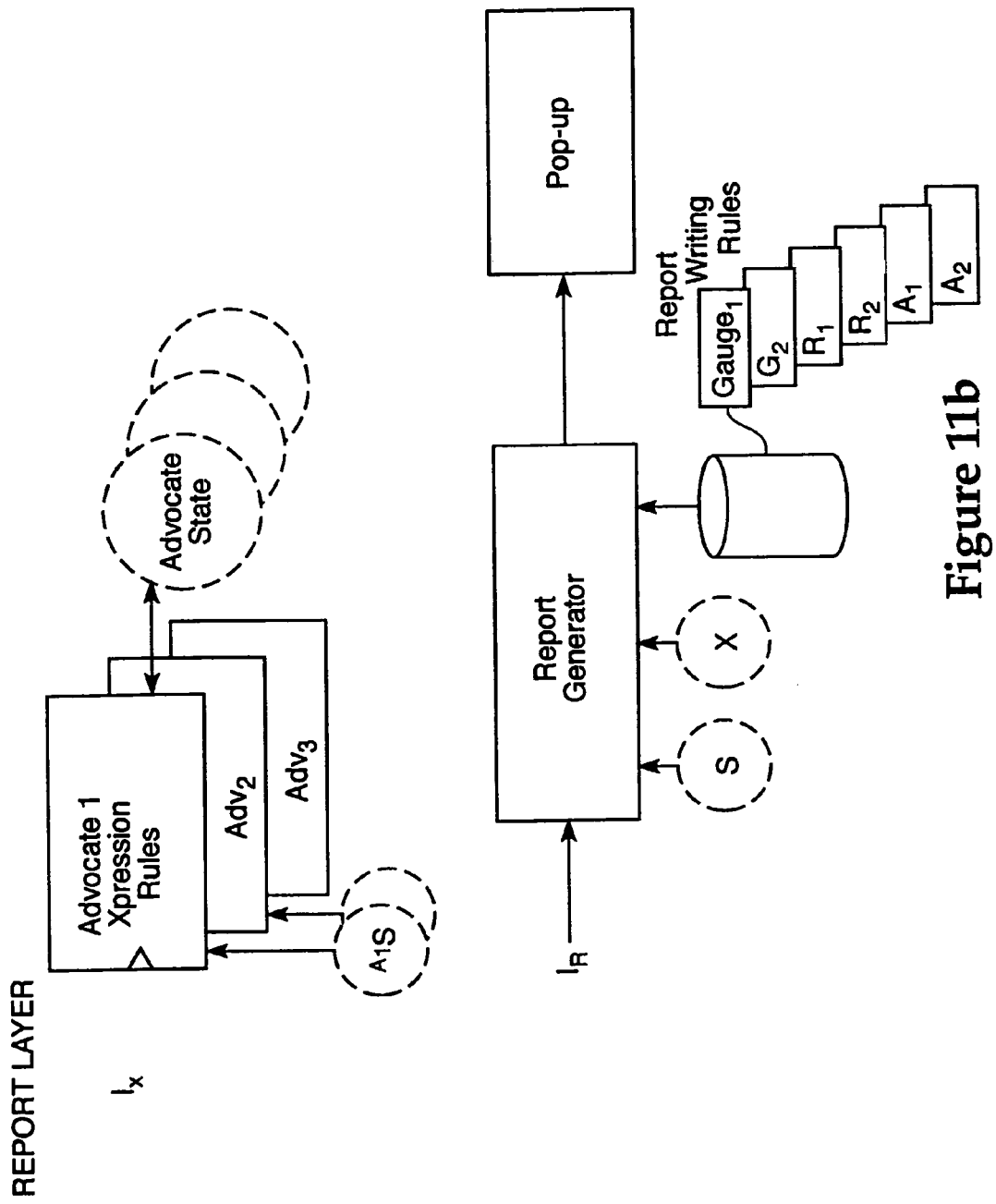

Referring again to FIG. 9, report layer 503 provides the report generation functions of computer-aided decision-making system 100 as described herein. Report generation activities performed by report layer 503 are further illustrated in FIGS. 11A and 11B. In a presently preferred embodiment, computer-aided decision-making system 100 provides a report zone which, upon user selection of a particular choice or other selectable item using the user interface (e.g., dragging an item into the report zone via mouse device), computer-aided decision-making system 100 provides further information (i.e., "education") regarding that item. In addition, computer-aided decision-making system 100 further comprises an interface that for providing report information to external applications. For example, in an exemplary automobile-buying application, computer-aided decision-making system 100 may provide the user's telephone number (with the user's permission) to a selected automobile dealer determined during the user session. Reports provided for an exemplary automobile-purchasing application include, but are not limited to, the following reports which may appear in more than one decision topic: Billboard (Self advocacy), Boxing-ring (Comparison), Magnifying glass (details), Investment value, Cost of ownership, Appraisal, Visualize (Imagine the proposal within a context), User comments and review, Reviews (Of other users, experts, etc.), Consumer report, User editing and localizing of the info, Scorecard Formatter, Decision History, Rejection (Waste Basket), The Shopping Cart (Handoff), in addition, other applications may include Allergies, Life-span calculator, Emotional Impact, Maps, Time-on-the-market estimator, Closing cost calculator, and Visit sheet.

Figure 12:
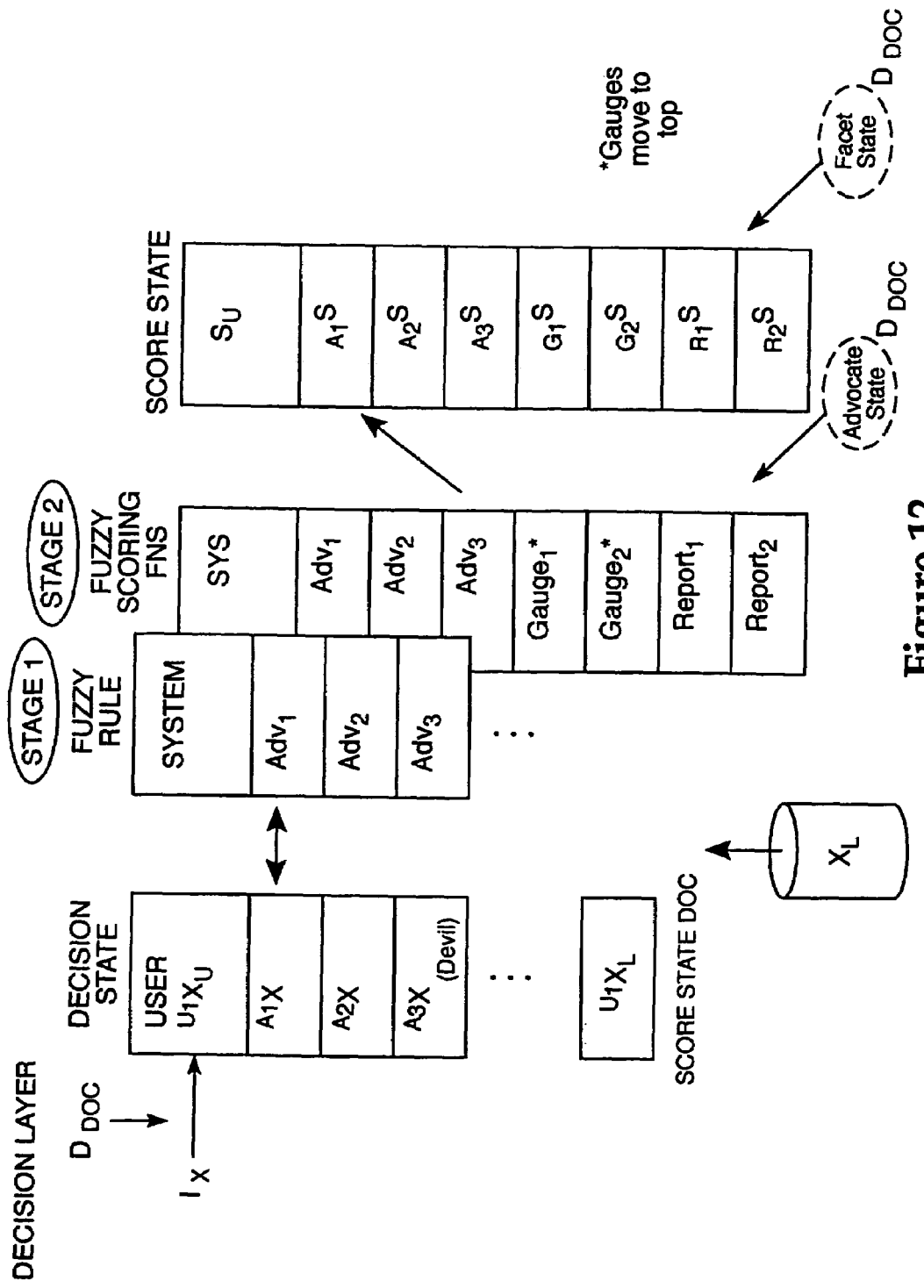
FIG. 12 illustrates the relationships between internal representations of rules, information, and states used and maintained by the computer-aided decision-making system.

Referring again to FIG. 9, decision layer 504 accomplishes the computational functions of computer-aided decision-making system 100, including, but not limited to, computational functions of analysis engine 330 and maintaining the current state of decisions/sub-decisions, scores, rankings, choice ordering, rule selection, and applied rule results. FIG. 12 illustrates the relationships between internal representations of rules, information, and states used and maintained by computer-aided decision-making system 100 in a presently preferred embodiment according to the notation contained herein. For example, referring to FIG. 12, decision state item $^{u1}X_u$ comprises all current user-made choices contained in the upper pane of a particular facet during a given user session. Accordingly, computer-aided decision-making system 100 may comprise a plurality of decision layers 504, each decision layer 504 being associated with the decision state of a particular facet 102. Similarly, referring again to FIG. 12, decision state item $^{An}X$, where n=1 to z, and where z is the maximum number of advocates involved in the application during a given user session, comprises the current state of the information associated with advocate "n" during a given user session. Other internal relationships as illustrated in FIG. 12 are apparent upon inspection of the contents of this specification and the preferred notation contained herein.

For an automobile-buying application, for example shown in FIGS. 16A through 16K, computer-aided decision-making system 100 comprises a handoff frame, a customization frame, a details frame, a proposals facet, an inventory frame, a vicinity frame, a dealer frame, a reviews frame, and frames associated with administrative functions (e.g., login). The handoff frame is used to allow the user to choose the information to be sent to an automobile dealer and includes advocates, a message box, a churn icon (to indicate analysis engine processing), an advocate pointer, and facets with a reject icon. Handoff frame facets comprise a My Vehicle facet, a Contact Information facet, a Decision Summary facet, and a Send facet. Further, each facet contains a toolbar for accepting user commands, including "Demote All, Promote All, Print, Save As, Cancel" buttons. The Demote button removes all choices from the upper pane. The Promote button adds all choice to the upper pane. When either button is pressed, the System Advocate reminds the user that this will include all, or none of the information in the facet. The Cancel button closes the window and returns the user to the host decision.

The My Vehicle facet includes upper and lower panes. The choices in the panes comprise the vehicle's sticker information. The user can order the choices in the upper pane in the order of the user preferences.

The Contact Information facet contains lower and upper panes. The choices in the panes are contact information not saved by the system. The choices in the upper pane display the information that the user should provide. The choices in the lower pane display the information that the user can provide. Information in the panes includes: "Name, Home Address, Home Phone, Contact Time, Work Address, Work Phone, Fax Number, Cell Phone Number, Pager Number." The lower pane also includes a "Message" choice which, when expanded in the upper pane, gives the user a field to type in a message that is sent to the dealer.

The Decision Summary facet includes lower and upper panes. The choices in the panes contain decision information relevant to the referral. The choices in the upper pane display the choices that the user has promoted to the upper panes of the host decision facets. The choices in the lower and upper panes are organized into container choices, named for the host decision facet the contained choices appear in.

The send facet contains one pane. The choices in this pane are all the choices in the upper panes of the other facets in the handoff frame. These choices cannot be dragged or edited and are her only for the user to review before sending them to a dealer. The user can review the choices, print them, or save a draft prior to sending it to the dealer, or cancel the referral and return to the host decision. Sending also saves the information, which will then appear as a report in the Topics Facet as a sub-choice of the decision.

The customization frame allows the user to customize the options and packages of a vehicle. The customization frame contains advocates, a message box, a churn icon, an advocate pointer, and a facet with a Reject icon. The customization frame has one facet, the Options facet, which includes upper and lower panes. The choices displayed in this frame are the options and packages available for a vehicle. The upper pane displays the options and packages the user has set in the host decision. The upper pane header displays the vehicle name, the MSRP and the invoice prices. As the user promotes and demotes choices in the upper and lower pane these prices change. The upper pane header also displays the following columns: Option Code, Option Name, MSRP Price, Invoice Price. The lower pane displays the other options and packages available for the vehicle. The lower pane header includes the following columns: Inclusion Icon (a checkmark), Option Code, Option Name, MSRP Price, Invoice Price, Conflict Icon (a red X), conflicting Option Code, Conflicting Option Name.

The details frame allows the user to review detailed information about a vehicle. The details frame contains advocates, a message box, a churn icon, an advocate pointer, and facets with a Reject icon. The details frame has two facets, "Details" and "Images". The Details facet includes lower and upper panes to display the set of choices that comprise the detail information of a vehicle. The choices in this facet are formatted for printing. The upper pane header has two columns: "Description" and "Value." The choices in the upper pane display the choices that the user has promoted to the upper panes of the host decision facets. The choices in the lower and upper panes are organized into container choices, named for the host decision facet the contained choices appear in. The Details facet toolbar includes the following buttons: "Print", "Save As", "Expand All" and "Collapse All" and "Close" The expand all and collapse all buttons expand and collapse the container choices in the upper and lower panes. The upper pane of the Details facet will include change view Icons allowing the user to view the pane as text, or as gauges.

The Images facet is organized into one pane that displays a list of images of the vehicle. The user can expand them, which displays the image. The Images Facet toolbar includes the following buttons: "Print", "Save As", "Expand All" and "Collapse All" and "Close."

The comparison frame allows the user to review the differences and similarities of vehicles. The comparison frame contains advocates, a message box, a churn icon, a advocate pointer, and facets with a Reject icon. The comparison frame has two facets, "Add" and "Compare". The Add facet includes a lower and upper pane. The lower pane contains all the choices in the upper pane of the Proposals Facet in the host decision. The upper pane contains the choice the user promoted. The user promotes additional choices from the lower pane and then chooses the Compare facet. The Compare facet includes upper and lower panes. The upper pane header has n columns, "Description," and a column for each of the vehicles that have been added to the upper pane of the Add facet. The choices in the upper pane display the choices that the user has promoted to the upper panes of the host decision facets. The choices in the lower and upper panes are organized into container choices, named for the host decision facet the contained choices appear in. The upper pane of the Compare facet includes change view icons allowing the user to view the pane as text, or as gauges. The Compare facet toolbar includes the following buttons: "Print", "Save As", "Expand All" and "Collapse All" and "Close."

The inventory frame includes advocates, a message box, a churn icon, an advocate pointer, and a facet with a Reject icon. The inventory frame has three facets: "Vehicle, Search, Available." The Vehicle facet includes a single pane that displays detailed information about the vehicle that the user has dragged to the report zone. The Search facet includes a lower and an upper pane. Choices in the lower pane include: Vicinity, Dealer, Price. The Available facet includes lower and upper panes. The choices displayed in the pane correspond to vehicles that meet the search criteria established in the Search facet. The user drags choices to the upper pane to refine their list.

The vicinity frame allows the user to choose a specific geographic area within which he is willing to purchase a car. The dealer frame allows the user to choose a specific dealer from which he is willing to purchase a car. The vicinity frame and the dealer frame each contain advocates, a message box, a churn icon, an advocate pointer, and a facet with a Reject icon.

The reviews frame allows a user to read reviews of a vehicle. The reviews frame contains advocates, a message box, a churn icon, an advocate pointer, and facets with a Reject icon. The reviews frame has one facet, "Reviews,"

which includes lower and upper panes. Choices in the panes are reviews of a vehicle. Promoting a review to the upper pane opens the review for the user to read or print. Screen displays for a typical automobile purchasing decision using the present invention are shown in FIGS. 16A through 16K wherein the various steps of choosing a vehicle are shown.

In an application for a search engine, computer-aided decision-making system 100 includes a search frame 600 comprising a hints and cues facet 601, an association facet 602, and a proposals facet 603 as shown in FIG. 14. In this embodiment, computer-aided decision-making system 100 provides a search capability suitable for, without limitation, Internet website searching. Hints and cues facet 601 comprises upper pane 104 containing user-entered search terms and lower panel 05 containing "hint" search term choices based on, for example, but not limited to, a user's previously-searched terms. Referring now to the example provided in FIG. 14, upper pane 104 of hints and cues facet 601 indicates that the user has specified searching for websites containing "XFI," of the "company" kind of website, related to a "decision," and related to "sales." Association facet 602 then refines the search terms developed with respect to hints and cues facet 601 by applying relationship and definitional rules maintained by computer-aided decision-making system 100 in the manner described herein. Referring now to the example provided in FIG. 14, rules associated with the "decision" search term determined with respect to hints and cues facet 601 specify that "decision" can mean a website related to a decision support system, or describing how to make decisions, or other related site. In a similar manner, rules associated with the "sales" search term determined with respect to hints and cues facet 601 specify that "sales" can mean a website related to, for example, a store or salesperson employment. Computer-aided decision-making system 100 applies these refined search term choices in the manner described herein to produce a ranked and ordered set of website choices in (lower pane 105 of) proposals facet 603 as described herein.

In summary, the computer-aided decision-making system supplies data, information, understanding, analysis, advice and organization to the decision process. The user supplies his values. Through this simple collaboration between tool and human, alternatives are distinguished quickly and effectively and common cognitive pitfalls are avoided until the preferred choice or choices become apparent.

Therefore, a computer-aided decision-making system and method has been described in the context of an exemplary on-line home buying purchase decision application. It should be recognized that the present invention is applicable to a variety of decision-making contexts and applications such as, but not limited to, those described in FIG. 13. The disclosed computer-aided decision-making system provides immediate, useful, and relevant information to a person in a decision-making context, overcomes common human cognitive problems that occur in decision-making, and enables consumer purchases in an on-line sales environment. In particular, aspects of the invention that aid a person in decision-making include, but are not limited to: managing all the sub-decisions, educating the decision-maker, highlighting the most important sub-decisions, offering the most viable proposals for evaluation, distinguishing significant differences between proposals, supplying various evaluation tools, preventing blind spots, assisting the decision-maker's memory, gauging the progress of the decision process, and learning about the decision maker from the decision process.

We claim:

1. A computer-aided decision-making system, comprising:
   a rules-based analysis engine employing a plurality of rules, said rules being used for selecting and scoring and ranking a plurality of choices;
   a user interface operable to accept user-provided information and selections and responses to system inquiries, said user interface indicating system-generated reports and proposals and feedback, said user interface comprising a plurality of advocates selectable by a user for assisting in a single choice and controlled by said rules-based analysis engine to aid the user in making the single choice, said advocates being abstract personalities embodied in software and representing points of view with respect to a decision to be made on the single choice, said points of view including relatively stronger positions on some issues and relatively weaker positions on other issues; and
   wherein said rules-based analysis engine accepts said user-provided information and presents through said user interface choices to aid the user in making a decision, said choices being at least one of commented on and chosen by said advocates.

2. A system of claim 1, wherein said user interface further comprises an upper pane and a lower pane for displaying a plurality of reports and decision gauges.

3. The system of claim 1, wherein said plurality of advocates each posses articulate behavior by printed message, sound or movement in response to said user's selection of a choice, said articulate behavior indicating the point of view of a corresponding one of said advocates.

4. The system of claim 1, wherein said rules-based analysis engine includes a plurality of databases, said databases comprising:
   a merchant/products database containing detailed product or service information; and
   a shopper profile database containing individual shopper or purchaser information pertaining to at least one of personal characteristics and purchasing behavior and product/service preferences.

5. The system of claim 4, wherein said rules-based analysis engine comprises:
   a residual knowledge database for maintaining errata and modifications to information contained in said merchant/products database; and
   a user decision document database capable of storing decision state information responsive to the user requesting to store a current decision state for later use.

6. The system of claim 4, wherein said rules-based analysis engine further comprises:
   a plurality of database descriptions for indexing of information contained in said databases;
   a plurality of system rules/facts that are applicable to a plurality of decision domains; and
   a plurality of application rules/facts that are specific to a particular decision domain.

7. The system of claim 1, wherein said rules-based analysis engine is a fuzzy logic system.

8. A computer-aided decision making system, comprising:
   a web browser;
   a server-side application/web server, wherein said web browser and said server-side application/web server form a distributed computing client-server system;
   a plurality of applets for running a rules-based analysis engine, rules of said rules-based analysis engine being used for selecting scoring and ranking a plurality of choices presented by said client-server system, said scoring and ranking retaining all of said plurality of choices without removal of lower ranking choices; and an interface having a first portion for displaying system-made choices and a second portion for displaying user-made choices, said first portion being distinct from said second portion, said second portion accepting the user-made choices as user preferences, said user choices being promoted from said first portion to said second portion;

wherein said client-server system aids a user browsing on the web in making a decision.

9. A computer-aided decision making system, comprising:
a web browser;
a server-side application/web server, wherein said web browser and said server-side application/web server form a distributed computing client-server system;
a plurality of applets for running a rules-based analysis engine, rules of said rules-based analysis engine being used for selecting scoring and ranking a plurality of choices presented by said client-server system, said scoring and ranking retaining all of said plurality of choices without removal of lower ranking choices; and
an interface having a first portion for displaying system-made choices and a second portion for displaying user-made choices, said second portion accepting the user-made choices as user preferences, said user choices being promoted from said first portion to said second portion;
wherein said client-server system aids a user browsing on the web in making a decision, wherein said plurality of applets provide a plurality of advocates giving advise to the user to aid in making a single decision, said plurality of advocates providing comments on at least said user-made choices, said advocates being abstract personalities embodied in software and representing points of view with respect to said decision, said points of view including relatively stronger positions on some issues and relatively weaker positions on other issues.

10. A computer implemented method for assisting a person in making a decision, comprising:
decomposing a choice into a plurality of subchoices, wherein said subchoices represent different dimensions of a decision space;
determining a plurality of potential proposals for each said subchoice;
ranking said subchoices according to a range of general to specific subchoices and presenting said ranking to a user for random access at any position along the general to specific ranking;
ranking said plurality of potential proposals in accordance with a user's selection among said plurality of subchoices;
ordering said proposals using presentation to indicate a relative ranking of said proposals;
presenting all of said plurality of proposals in ranking order to the user without removing proposals from said plurality of proposals; and
accepting a selection by the user of any proposal of said plurality of proposals regardless of a position of a chosen proposal in said ranking order.

11. The method of claim 10, wherein said step of decomposing a choice into a plurality of subchoices further comprises:
retrieving system-provided subchoices specific to a decision domain from a set of application rules/facts;
accepting user input regarding said subchoices via an input;
aggregating said subchoices into distinct facets based upon type of information;
establishing a multidimensional hierarchical relationship among said facets, wherein said facets are ordered within a dimension according to increasing specificity to an ultimate selected proposal; and
accepting a user selection of an ultimate proposal prior to receiving input from the user for each of said facet so that the decision process is ended prior to consideration of each facet.

12. The method of claim 10, wherein said step of determining a plurality of potential proposals further comprises:
retrieving system-provided values for each said subchoice from a set of databases;
accepting user-provided values via said input for at least one of said subchoices;
calculating an overall weighted score for each subchoice by use of an analysis engine combining said system-provided values and said user-provided values to establish boundaries to said potential proposals based on said system provided values and said user provided values;
generating a plurality of proposals in accordance with said weighted score, aid generated plurality of proposals including proposals both within said boundary and outside said boundary; and
accepting promotion of a proposal by the user from outside said boundary to inside said boundary.

13. The method of claim 12, wherein said step of calculating further comprises:
adjusting value of said system-provided values to user selected values;
predicting by look-ahead an adjustment of a ranking of a choice in order to solicit user feedback for that choice when a determination is made that such user feedback would assist a user in converging to a selected choice.

14. A computer readable media that causes a computer-aided decision-making system to aid a user in making a choice, comprising performing the steps of:
retrieving system-provided subchoices specific to a decision domain from a set of application rules/facts;
accepting user input regarding said subchoices via an input;
aggregating said subchoices into distinct facets based upon type of information;
establishing a multidimensional hierarchical relationship among said facets, wherein said facets are ordered within a dimension according to increasing specificity to an ultimate selected proposal to define ordered facets; and
permitting user access to ones of said facets without regard to a position of a currently accessed facet relative to a previously accessed facet of said ordered facets, said user access permitting user promotion of subchoices.

15. The computer readable media of claim 14, wherein a plurality of advocates are presented to said user to aid in selecting a proposal, said plurality of advocates each being an abstract personality embodied in software and representing a point of view with respect to the decision, said point of view including relatively stronger positions on some issues and relatively weaker positions on other issues.

16. The computer readable media of claim 15, wherein said plurality of advocates articulate their potentially different opinions relating to said point of view by one of printed message and sound and movement.

17. A computer-aided decision making system for deciding among a plurality of choices, comprising:
   a rules-based analysis engine;
   a user interface accepting input from a user and providing output including results of application of said rules-based analysis engine to inputs of the user;
   a plurality of advocates having predetermined mutually different perspectives relating to said choices, said plurality of advocates applying said predetermined mutually different perspectives to said choices and presenting corresponding different perspectives to the user, said plurality of advocates being abstract personalities embodied in software, said abstract personalities having relatively stronger positions on some issues related to said decision and relatively weaker positions on other issues related to said decision.

18. A computer-aided decision making system as claimed in claim 17, further comprising: an advocate control operable so that the user selectively applies said predetermined perspectives of said plurality of advocates to said choices.

19. A computer-aided decision making system as claimed in claim 17, wherein said plurality of advocates provide said predetermined perspectives to the user in an unsolicited manner.

20. A computer-aided decision making system as claimed in claim 19, wherein said unsolicited perspectives of said plurality of advocates are triggered by an input by the user that represents a position contrary to a position represented by a prior input by the user.

21. A computer-aided decision making system as claimed in claim 20, wherein said plurality of advocates have mutually different strengths of positions on issues relating to said decision, and said plurality of advocates are presented to the user on said user interface ordered according to said strengths of said positions of said advocates.

22. A computer-aided decision making system as claimed in claim 19, further comprising: an advocate mute operable by the user to selectively mute a presentation of a perspective from said plurality of advocates.

23. A computer-aided decision making system as claimed in claim 19, further comprising: a threshold for advocate responses which inhibits responses from said plurality of advocates when a difference between an expected choice and a user-entered choice is below said threshold.

24. A computer-aided decision making system as claimed in claim 17, wherein said plurality of advocates present educational information to the user relating so said choices.

25. A computer implemented method of sorting proposals, comprising the steps of:
   providing a plurality of choices for a user;
   accepting input from the user;
   applying a rules-based analysis to said plurality of choices from said input of the user to assign a rank to each of said choices; and
   presenting an ordered sort of all choices of said plurality of choices according to said rules-based analysis;
   accepting designations of choices preferred by the user to a short list;
   fixing sort values in said ordered sort of choices designated to said short list;
   accepting further input from the user, said further input including input that is inconsistent with the designations by the user, said inconsistent input being accepted; and
   resorting choices based on said further input without resorting choices designated to said short list.

26. A computer implemented method of sorting proposals, comprising the steps of:
   providing a plurality of choices to a plurality of users;
   receiving input from the plurality of users;
   applying a rules-based analysis to said plurality of choices from said input of the user to assign a rank to each of said choices;
   presenting an ordered sort of all choices of said plurality of choices according to said rules-based analysis;
   providing a plurality of advocates, each of said advocates being an abstract personality embodied in software and representing a point of view with respect to a single decision, said point of view including strong positions on some issues relating to said decision and weak positions on other issues relating to said decision, one of said advocates being a user advocate associated with at least one of the users, said user advocate representing the relatively stronger positions and relatively weaker positions of said at least one user relating to said proposals to others of the users.

27. A method of rules based analysis in a computer aided decision-making system in which rules operate on logical entities of a decision frame, comprising the steps of:
   sorting hierarchically arranged facets horizontally in order of increasing specificity to thereby provide:
      upper panes containing input or proposal choices reflecting user values, said input or proposal choices each being one of choices and other decision frames; and
      lower panes containing input or proposal choices reflecting system generated surrogate values in which choices are sorted vertically in order of decreasing importance to decision outcome, said values being provided by a user/decision maker in said upper pane and by the system in said lower pane;
   providing a plurality of advocates each representing a different predefined point of view, said point of view being an encapsulation of a different set of inter-choice rules and a different set of surrogate values and which are capable of informing the user/decision maker of input that meets a criteria of being at least one of inconsistent and incomplete and inadequate; and
   providing gauges which inform the decision maker of a degree to which further input is capable of influencing a decision state.

28. A method of sorting proposals, comprising the steps of:
   logically grouping a set of input parameter choices into one or more subsets called facets based on relative generality and specificity of the parameters to a decision topic at hand; and
   logically sorting said facets from general to specific wherein the facets sorted to a more general relate to a decision topic at hand and being sorted to a left hand and the facets sorted to a more specific relate to the decision and being sorted to a right hand, a most specific facet containing final proposal choices.

29. A method of claim 28, wherein said choices are sorted within a facet in decreasing order of influence to a proposal sort.

30. A method of claim 28, wherein said facets comprise the following: user information, topics, goals, requirements, and proposals.

31. A method of claim 28, wherein one or more of the more general facets provided at a left hand portion are made available to other applications or sub-choices.

32. A method of claim 28, wherein the system generated sort order of proposal choices are manually altered by a user through promotion into a logical upper pane, causing the system to resort all current lower pane choices in all facets.

33. A method of claim 28, further comprising the step of: grouping proposal choices into a facet, said choices being sorted according to decreasing desirability based on a current choice state in all other facets.

34. A method of claim 28, wherein choices are sorted within facets from the choices that are most influential in the final facet and proposal sort to the choices that are least influential to the final facet and proposal sort, said most influential being sorted to a top of the facet and said least influential being sorted to a bottom of the facet.

35. A method of claim 28, further comprising the step of: applying a look-ahead function to elevate a ranking of choices in the lower pane and other facets based on choices promoted to the upper pane in the current facet.

36. A method of claim 28, further comprising the step of: logically dividing choices and proposal choices within a facet into an initially empty promotion/upper pane set and lower pane set, said lower pane set being initially sorted according to a predefined point of view or surrogate value scheme.

37. A method of claim 28, further comprising the step of: initially sorting choices and setting said choices to reflect a predefined point of view comprising a set of default or surrogate values, said predefined point of view representing an abstract personality or stereotype.

38. A method of claim 28, further comprising the step of: selecting a plurality of predefined points of view or value schemes by a user to best approximate the users own point of view or value scheme, said plurality of points of view being blended together to affect a sorting of choices within a facet, said sorting bringing more influential choices to a top of the list within each facet, said more influential choices being more suitable proposal choices.

39. A method of claim 28, further comprising the step of: accepting at least one point of view from the actual input of other live users in a decision state dataset available to the user, whereby collaborative decision is possible within a topic.

40. A method of claim 28, further comprising the step of: accepting user input as refined values of choices and proposal choices by promoting said choices to an upper pane subset within a facet to provide a promotion list, said promotion list having enhanced influence on and overall sort of both choices and proposal choices and ranking higher in influence than un-promoted choices within a facet.

41. A method of claim 28, further comprising the step of: performing a re-sort upon promotion of a proposal choice into an upper pane list to cause resorting of an entire decision state.

42. A method of claim 28, wherein facets are accessed in multiple iterations and random order, each iteration refining the sorting of proposal choices to conform more closely to a user's value scheme as represented by the user's current choices, advocates, and collaborators.

43. A method of claim 28, wherein act of promotion causes all choices and proposal choices in all facets to be re-sorted in light of changed influence due to the choice promotion.

44. A method of claim 28, wherein an act of promoting a choice recursively invokes another instance of the method of sorting proposals to aid the user in deciding on a choice value within the current decision topic, a proposal choice of the invoked method furnishing the choice value of the invoking method.

45. A method of claim 28, wherein promotion of one or more choices within a facet causes a re-sorting of choices within each logically adjacent facet, each of which causes a resorting of its adjacent facets, including ultimately a logically rightmost proposal facet, resulting in every choice promotion causing all other choices to be re-sorted in an order of maximum influence and relevance, and all proposal choices to be re-sorted in an order most closely conforming to the user's actual inputs and the influence of selected advocates.

46. A method of claim 28, wherein resorting is by transposition of rows in a facet (n) into columns of a facet (n+1).

* * * * *